United States Patent
Brett et al.

(10) Patent No.: US 9,954,243 B2
(45) Date of Patent: Apr. 24, 2018

(54) FUEL CELL COMPRISING AT LEAST TWO STACKED PRINTED CIRCUIT BOARDS WITH A PLURALITY OF INTERCONNECTED FUEL CELL UNITS

(75) Inventors: Daniel John Leslie Brett, Gerrards Cross (GB); Anthony Robert John Kucernak, Cambridge (GB)

(73) Assignees: Imperial Innovations Limited, London (GB); UCL Business PLC, London (GB)

( * ) Notice: Subject to any disclaimer, the term of this patent is extended or adjusted under 35 U.S.C. 154(b) by 598 days.

(21) Appl. No.: 14/002,465

(22) PCT Filed: Feb. 29, 2012

(86) PCT No.: PCT/EP2012/053479
§ 371 (c)(1),
(2), (4) Date: Nov. 8, 2013

(87) PCT Pub. No.: WO2012/117035
PCT Pub. Date: Sep. 7, 2012

(65) Prior Publication Data
US 2014/0057138 A1 Feb. 27, 2014

(30) Foreign Application Priority Data
Mar. 1, 2011 (GB) .................................. 1103590.4

(51) Int. Cl.
*H01M 8/2465* (2016.01)
*H01M 8/0228* (2016.01)
(Continued)

(52) U.S. Cl.
CPC ....... *H01M 8/2465* (2013.01); *H01M 8/0228* (2013.01); *H01M 8/0269* (2013.01);
(Continued)

(58) Field of Classification Search
None
See application file for complete search history.

(56) References Cited

U.S. PATENT DOCUMENTS 6,127,058 A * 10/2000 Pratt ................... H01M 8/0297
429/480
2002/0160244 A1* 10/2002 Wu ..................... H01M 8/0258
429/435
(Continued)

FOREIGN PATENT DOCUMENTS

EP 2337132 A1 6/2011
GB 1091303 A 11/1967
(Continued)

OTHER PUBLICATIONS

PCT International Search Report for PCT/EP2012/053479 mailed Oct. 7, 2012.
(Continued)

*Primary Examiner* — Maria Laios
(74) *Attorney, Agent, or Firm* — Kaplan Breyer Schwarz, LLP

(57) ABSTRACT

A fuel cell comprising at least two stacked fuel cell boards (22) which each comprise a membrane of substantially gas impervious electrolyte material and at least two electrode pairs wherein the anode and cathode of each said electrode pair are arranged on respective faces of said membrane. An electrode of each pair of electrodes is connected to an electrode of an adjacent pair of electrodes by a through-membrane connection (13) or by an external connection on a Printed Circuit Board, comprising an electrically conductive region of said electrolyte material. A method for forming the through-membrane electrical connections in the electrolyte membrane is also disclosed.

33 Claims, 17 Drawing Sheets

(51) Int. Cl.
*H01M 8/0202* (2016.01)
*H01M 8/0297* (2016.01)
*H01M 8/04082* (2016.01)
*H01M 8/04029* (2016.01)
*H01M 8/1004* (2016.01)
*H01M 8/1007* (2016.01)

(52) U.S. Cl.
CPC ..... *H01M 8/0297* (2013.01); *H01M 8/04029* (2013.01); *H01M 8/04082* (2013.01); *H01M 8/1004* (2013.01); *H01M 8/1007* (2016.02)

(56) References Cited

U.S. PATENT DOCUMENTS

| | | | |
|---|---|---|---|
| 2004/0185319 A1* | 9/2004 | Enjoji | H01M 8/0267 429/432 |
| 2005/0031926 A1 | 2/2005 | Sugimasa | |
| 2005/0202297 A1 | 9/2005 | Schmitz | |
| 2005/0202305 A1* | 9/2005 | Markoski | H01M 8/0206 429/483 |
| 2006/0269821 A1 | 11/2006 | Nakagawa et al. | |
| 2008/0233446 A1 | 9/2008 | Zimmerman | |
| 2008/0280183 A1 | 11/2008 | Eun | |
| 2010/0203426 A1 | 8/2010 | Chiu et al. | |

FOREIGN PATENT DOCUMENTS

| | | |
|---|---|---|
| JP | H08130023 A | 5/1996 |
| JP | 2001273914 A | 10/2001 |
| JP | 2002110215 A | 4/2002 |
| JP | 2004234973 A | 8/2004 |
| JP | 2005087989 A | 4/2005 |

OTHER PUBLICATIONS

GB Intellectual Property Office Search Report dated Jun. 14, 2011.
"Office Action" issued in counterpart Japanese patent application No. 2013-555865, dated Jun. 20, 2017.

* cited by examiner

FUEL CELL COMPRISING AT LEAST TWO STACKED PRINTED CIRCUIT BOARDS WITH A PLURALITY OF INTERCONNECTED FUEL CELL UNITS

CROSS REFERENCE TO RELATED APPLICATIONS

This application is a national phase of PCT application No. PCT/EP2012/053479, filed 29 Feb. 2012, which claims priority to GB patent application No. 1103590.4, filed 1 Mar. 2011, all of which are incorporated herein by reference.

TECHNICAL FIELD

This invention relates to fuel cells, for example solid polymer electrolyte fuel cells. This invention also relates to the use of Printed Circuit Board (PCB) technology in the manufacture of fuel cells of the present invention, the use of corrosion-resistant coatings, and the use of a Shape Memory Alloy (SMA) in low profile valves in fuel cells.

BACKGROUND ART

A fuel cell is an electrochemical device which generates electrical energy and heat from an oxidant (e.g. pure oxygen or air) and a fuel (e.g. hydrogen or a hydrogen-containing mixture, or a hydrocarbon or hydrocarbon derivative). Fuel cell technology finds application in portable, mobile and stationary applications, such as power stations, vehicles and laptop computers.

Typically, a cell comprises two electrodes, an anode and a cathode, which are separated by an electrolyte membrane that allows ions (e.g. hydrogen ions) but not free electrons to pass through from one electrode to the other. A catalyst layer on the electrodes accelerates a reaction with the fuel (on the anode electrode) and oxidant (on the cathode electrode) to create or consume the ions and electrons. The electrons freed at the anode form an electrical current, which is used to perform work and then flows to the cathode where the electrons are consumed.

A single pair of electrodes separated by an electrolyte membrane is called a Membrane Electrode Assembly (MEA). A fuel cell MEA operating under a moderate load produces an output voltage of about 0.7 V, which is too low for many practical considerations. Conventionally, in order to increase this voltage, MEAs are assembled into a stack as shown in FIG. 1. Each MEA 1 has a layer of "electrolyte membrane" 1a, which is an ion-permeable membrane sandwiched between two electrolyte layers, and an anode 2 and a cathode 3 on opposite faces of the electrolyte membrane. Adjacent MEAs can be separated by an electrically conducting bipolar separator plate 4 and hydrogen fuel 5 and oxygen gas 6 flow through the channels provided on opposed faces of the bipolar plate. End plates 9 are connected to an external circuit via an electrical connection 7, 8. The number of these MEAs in a stack in a fuel cell determines the total voltage, and the surface area of each membrane electrode determines the total current.

A problem with current fuel cell geometry is that when fuel cells are stacked in this manner, the electrical current flows perpendicular to the face of an MEA. Hence, this stacking requires separator plates to conduct the current from the positive electrode of one cell to the negative electrode of the next. Furthermore, failure of an MEA, for example due to pinhole formation through the membrane electrolyte or short-circuiting of electrodes across the membrane, results in the entire stack needing to be shut down. Yet further, if a single MEA is not performing as well as the others, current will be driven through it, which results in its rapid degradation. If one MEA is destroyed then the whole fuel cell stack becomes unusable.

In the known arrangement the bipolar plates are commonly made of graphite carbon or stainless steel and must be electrically conductive, gas impervious and incorporate the flow-field channels for the distribution of reactants, and possibly also of coolant, across the faces of the MEA in their surface. Thus, the material composition of the bipolar plates is constrained and the plates are complex and expensive to manufacture. Furthermore, maintaining the correct water content in the electrolyte membrane is essential to optimising its performance. The membrane requires a certain level of moisture to operate and conduct the ionic current efficiently so that the cell current does not drop. Water produced by the cell is removed by the flow of gas along the cathode, or wicked away. Accordingly, corrosion of metallic bipolar plates in the humid environment of the cell is a common problem, limiting the materials from which the bipolar plate can be made. Overheating of the fuel cell stack is a further problem and cooling is necessary. This is usually achieved by the provision of further plates comprising channels to circulate coolant water through the middle of the stack, which is cumbersome and impractical for many applications. Further still, the electrical output of a stack is modulated and regulated by using monolithic power electronics. This is expensive and point failure of these power electronics also leads to failure of the whole fuel cell system.

One known alternative is described in "New SPFC-Technology with Plastics", by K. Ledjeff and R. Nolte, Proceedings of the First International Symposium on New Materials for Fuel Cell Systems, 1995, p128-134. The authors describe a banded structure of a single electrolyte membrane to generate a high output voltage, without employing stack technology. The electrodes and bipolar plates of a standard construction fuel cell are mounted in a co-planar configuration, with each fuel cell MEA present as a band joined to a second adjacent MEA band. A problem with this approach is that the membrane structure requires careful assembly and sealing of the adjacent bands to avoid mixing of oxidant and fuel.

The invention is set out in the claims. The construction of a stacked fuel cell is greatly simplified, as plastic or other non-electrically conductive spacers may be used between adjacent MEAs as opposed to complicated and expensive bipolar plates. Because of the layout of the fuel cell of the present invention, there is low risk of fuel mixing with oxygen. Individual MEAs or fuel cell boards in the fuel cell stack may also be incorporated with an independent switch which provides additional control of the fuel cell.

In the following discussion the invention is described by reference to three embodiments. The description of these embodiments is not to be understood to limit the scope of the present invention and is merely exemplifying the invention.

BRIEF DESCRIPTION OF THE FIGURES

Specific embodiments of the invention will now be described by reference to the accompanying Figures in which:

FIG. 2 (b) shows a perspective view of a fuel cell board according to the first embodiment of the present invention.

FIG. 5 (b) shows a perspective view of a spacer with surface channels.

FIG. 5 (c) shows a plastic spacer viewed from above or below, having an internal conduit provided for a coolant.

FIG. 13 (c) shows a plan view of the individual layers of a fuel cell board of the third embodiment of the present invention.

Figure 1:
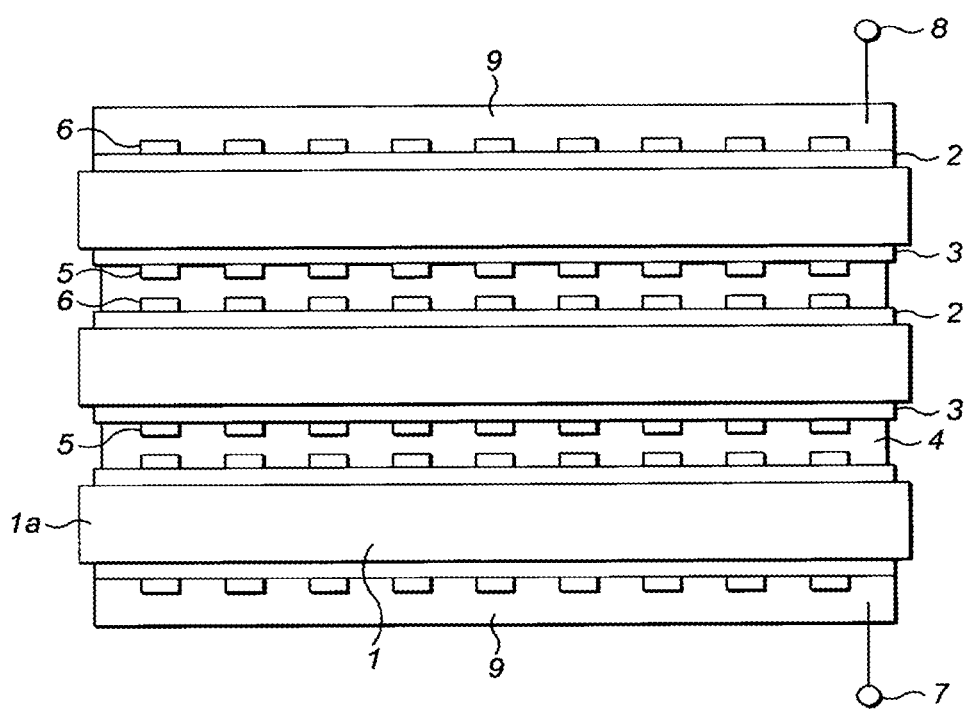
FIG. 1 shows a schematic side view of a stacked fuel cell of the known type.
Figure 2A:
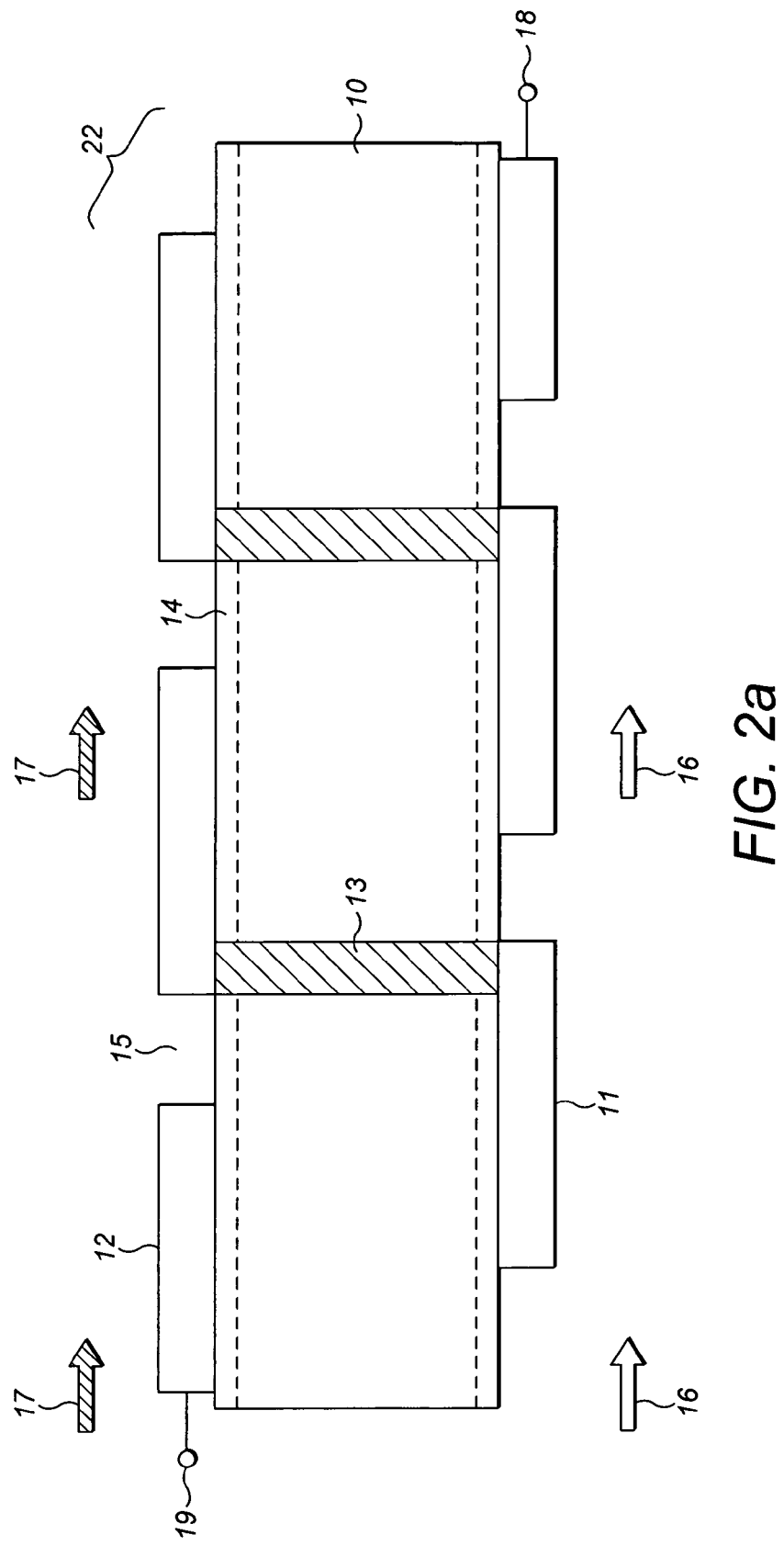
FIG. 2 (a) shows a cross-sectional side view of a fuel cell board according to the first embodiment of the present invention.
Figure 2B:
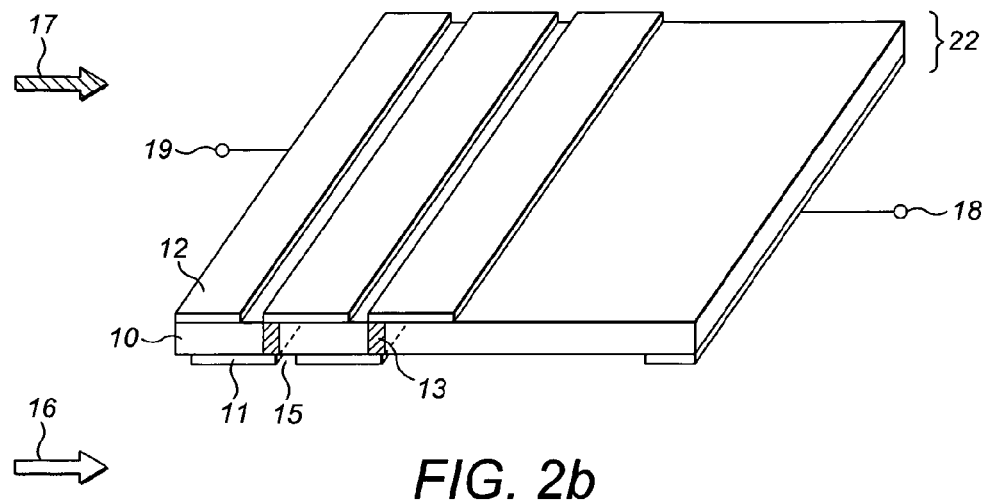

A first embodiment of the invention can be understood referring to FIGS. 2 (a) and 2 (b) in which electrode pairs are arranged in a series along either side of a single layer of polymer electrolyte 10, such as a Nafion™ membrane, to form a membrane or sheet, termed here a fuel cell board 22. Anodes 11, separated by gaps 15, are situated on one face of this membrane and cathodes 12, separated by gaps 15, are situated on the other face of this membrane. The anode and cathode respectively of two adjacent electrode pairs may partially overlap. Through-membrane electronic connections 13 connect the electrodes across the membrane in the overlapping region and are produced by a homogeneous chemical deposition process described in more detail below. A catalyst layer 14 adjacent to the electrodes encourages the reactions at the electrodes. A fuel 16, such as hydrogen gas, flows along the face of the fuel cell board 22 supporting the anodes; an oxidant 17, such as oxygen gas or air, flows along the face of the fuel cell board supporting the cathodes. One electrode at the edge of the upper face and one electrode at another edge of the lower face of a fuel cell board are connected to an external circuit via an electrical connection 18, 19. In this series arrangement, the surface area of an electrode pair determines the size of the current for a fuel cell board 22, but the voltage builds up corresponding to the number of electrode pairs on that fuel cell board 22.

In the preferred embodiment, the thickness of the electrolyte membrane layer 10 is between 1-200 μm, and preferably between 5-100 μm. The electrode bands 11, 12 are 1 mm-5 cm in width, preferably 2 mm-1 cm in width. The gaps 15 between the electrode bands are between 0.1 mm-1.5 cm wide, preferably between 0.2 mm and 1 cm wide. The width of the through-membrane electronic connectors 13 is 1 μm-2 mm, and preferably 10 μm-1 mm.

Figure 3:
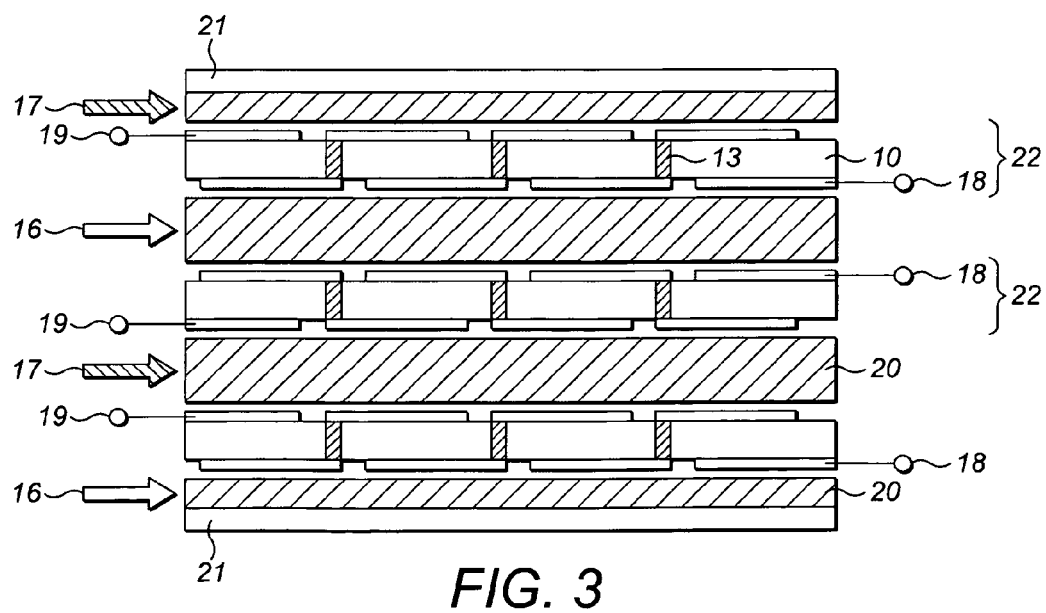
FIG. 3 shows a sectional side view of a fuel cell comprising a stack of fuel cell boards according to the first embodiment of the present invention.
Figure 4:
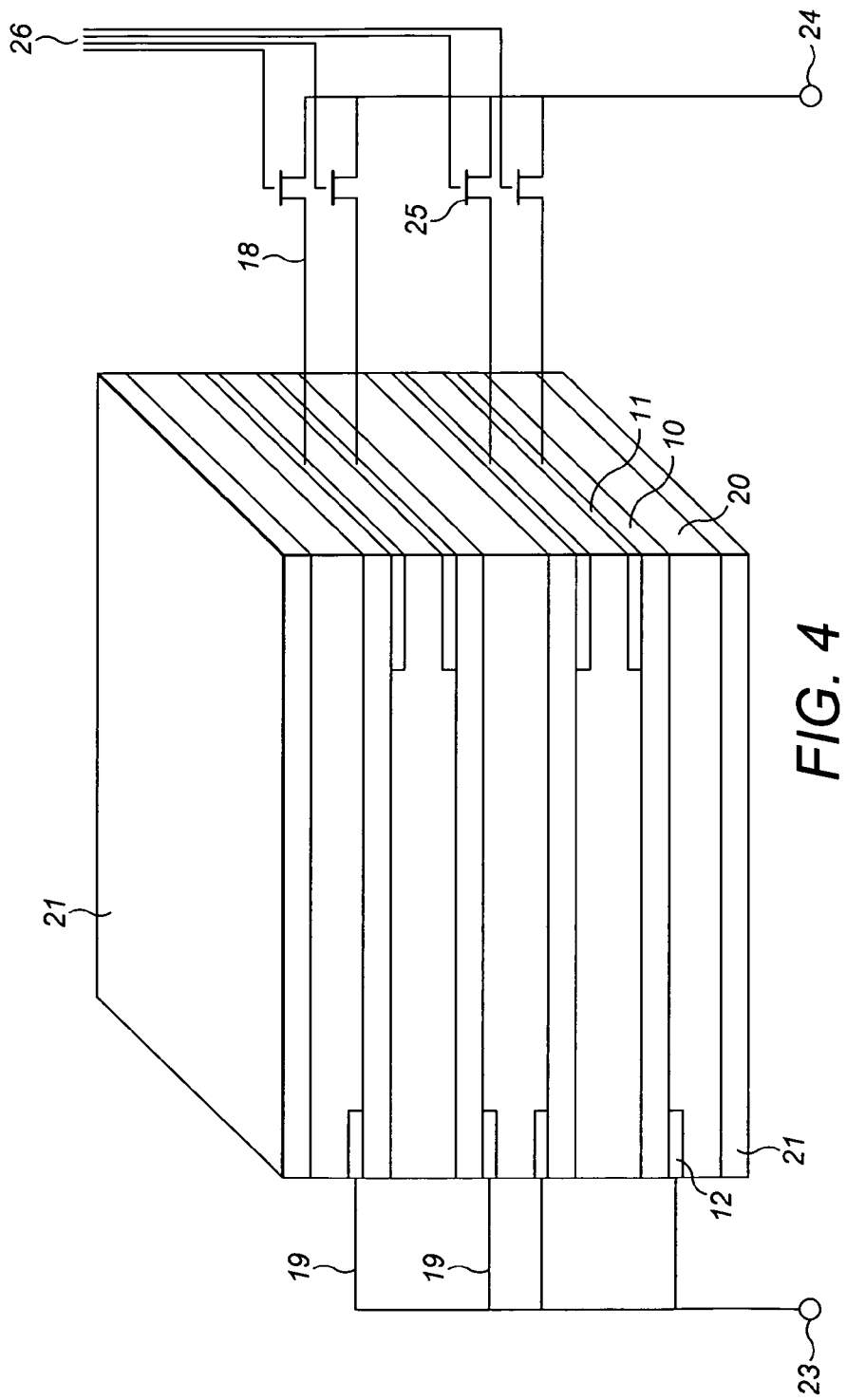
FIG. 4 shows a perspective view of a fuel cell system according to the first embodiment of the present invention.

FIGS. 3 and 4 show a fuel cell, wherein multiple fuel cell boards 22 are stacked between two endplates 21 in order to provide increased current. Electrically insulating spacers 20 are integrated into the stack between each of the fuel cell boards each comprising an spacer composed of electrically insulating material, which can incorporate a reactant distribution system as well as optionally containing channels or conduits associated with the cooling system and optionally containing a distribution system for delivering or removing water. The spacers 20 may be arranged in any suitable layout, as well as possibly containing channels or conduits associated with the provision of water required for the hydration of the membranes or the extraction of product water, as discussed in more detail below. The size of a single cell (that is, the surface area of a pair of electrodes) determines the size of the current for a fuel cell board. The number of these single cells on a fuel cell board determines the voltage produced. The number of fuel cell boards in a stack determines the size of the total current of the fuel cell stack. Manifolds of any appropriate form (not shown in FIGS. 3 and 4) supply and collect the reactants respectively at the inlets and outlets of the cell; and may incorporate further inlets and outlets for the coolant and the hydration/product water.

As there is no requirement for electrical contact between the fuel cell boards in the present invention, the bipolar plate used in current fuel cell designs can be replaced by a simple plastic spacer which is easily manufactured and hence cheap. Similarly, as it is no longer necessary to stack the anode of one fuel cell board next to the cathode of the next, adjacent fuel cell boards may have their anode sides (or cathode sides) facing each other in which case porous spacers 20 can be provided as there is no risk of the gases mixing. This results in a significant increase in packing density of the fuel cell as one gas flow can serve two fuel cell boards, reducing the number of seals, and increasing the power density. Repeat distances (i.e. the thickness of the combined fuel cell board and feed region) may be as low as about 0.2 mm. Hence a far higher volumetric power density of the fuel cell system is achievable. Further, the channels in the surface are easily formed for gas circulation and internal conduits are easily integrated into the spacer, allowing coolant and/or water to circulate and providing a cooling and water distribution system for the stack. Channels provided for the reactant gases and channels or conduits associated with the cooling and/or water distribution system are separate as discussed in more detail below.

The end cathodes 12 and anodes 11 on each fuel cell board are connected to respective first and second output lines 23, 24 via electrical connections 18, 19. The connection between each fuel cell board in the stack and the second output line 24 can be controlled by a switch mechanism 25 such as a field-effect transistor (FET) switch providing power handling and control directly at the cell. Each of these switches can be controlled by individual control lines 26. For this reason, failure of a fuel cell board is not serious, as each individual fuel cell board can be "switched off" or its loading may be reduced, allowing power handling and control at the cell using cheap low-current switches.

Figure 5A:
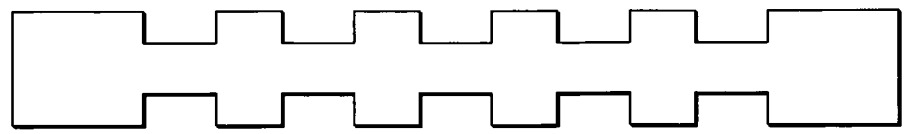
FIG. 5 (a) shows a cross-sectional side view of a spacer with surface channels.
Figure 5B:
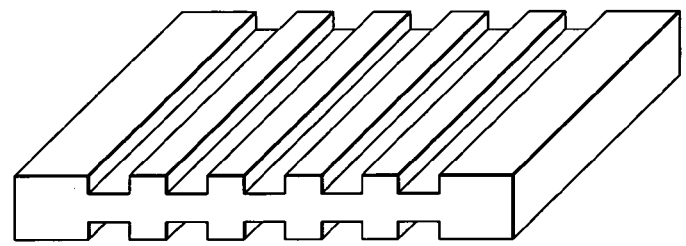
Figure 5C:
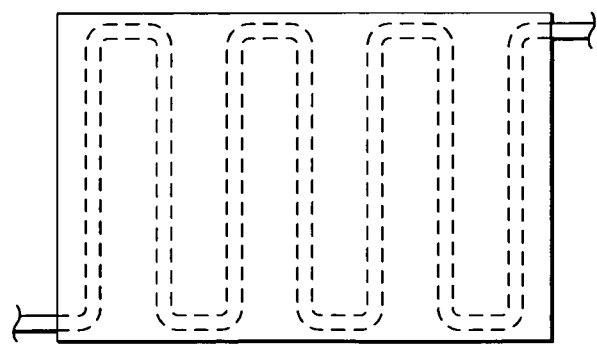

FIGS. 5 (a) to (c) show in more detail an insulating spacer 20 with channels 27 etched into its surface for the reactants to flow through and one possible layout of an internal cooling channel 28 (shown by dotted lines), which allows a cooling gas or liquid to circulate between the layers of the fuel cell boards. For most efficient cooling, these channels may be provided in the spacers between every layer, or between multiple layers such as every $2^{nd}$, $3^{rd}$ or $4^{th}$ fuel cell board layer in the fuel cell stack.

Figure 7:
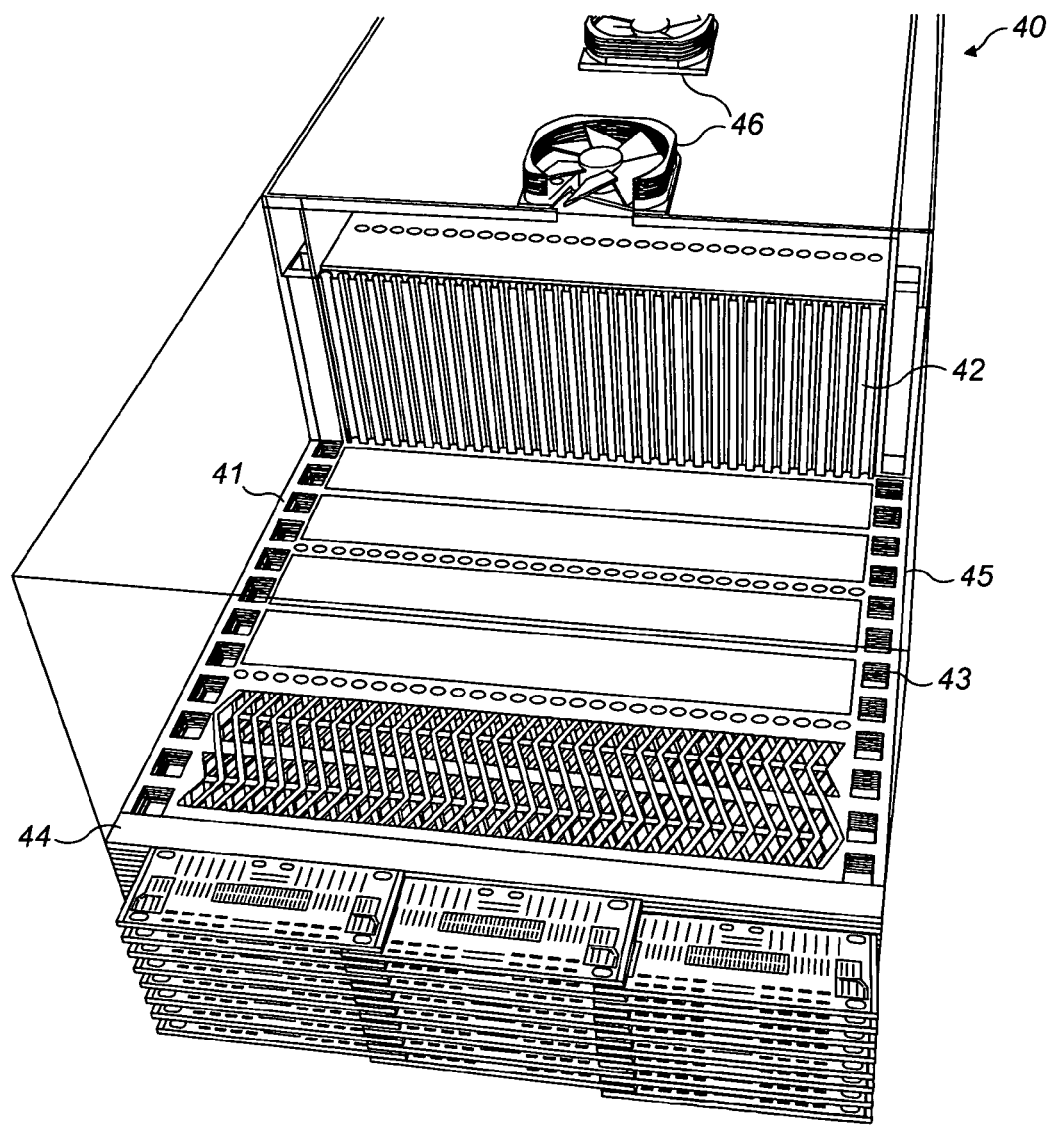
FIG. 7 shows a perspective, partial cut-away view of a fuel cell stack of the second embodiment of the present invention.

Alternatively, as shown in FIG. 7, cooling may be provided by means of a fan 46 situated at one or more edges of the fuel cell stack, blowing air through the stack in channels. This leads to effective cooling being achieved, as the single channel necessary for reactants allows faster flow of gas through the layers of the stack than a bipolar plate or a further separate plate used for a cooling system. Further, a larger volume of gas may be used, which also improves cooling. Coolant is pumped through the cooling channels to maintain the stack at a desired operating temperature.

Figure 6:
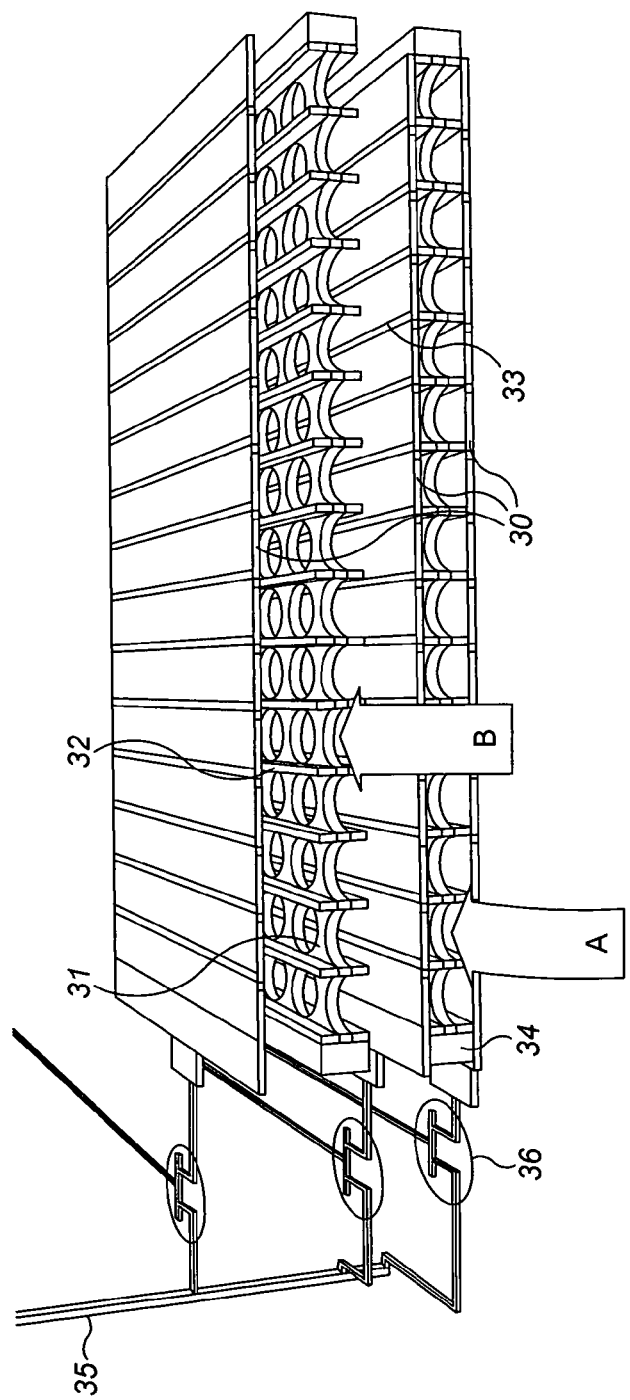
FIG. 6 shows a partially exploded perspective view to show the internal structure of a section of the fuel cell stack of the first embodiment.

FIG. 6 shows a partially exploded cross sectional view of the internal structure of a section of the fuel cell stack. Banded MEAs 30 are arranged with the anodes of (in this illustration) vertically adjacent MEAs facing each other and the cathodes of vertically adjacent MEAs also facing each other. Oxygen or air A is delivered to the cathodes, while fuel B, such as hydrogen, is delivered to the anodes. The porous, electrically non-conductive spacer 31 having gas distribution channels forms a gas distribution layer using ribs 32 of a flexible electrically non-conductive material. The ribs are positioned along the gaps 33 between the bands of electrodes. Each fuel cell board is sealed from the atmosphere with a seal 34 and is attached to an external circuit, or bus bar 35, for example via an FET switch 36.

The porous, electrically non-conductive spacer 31 may be made of a rigid plastics material. Preferably the ribs 32 and seals 34 are made of polydimethylsiloxane (PDMS), or a similar flexible material that provides a tight seal.

In order to fabricate the fuel cell stack, multiple bands of electrodes are, for example, screen printed onto both the upper and lower face of a membrane, the anodes and cathodes being in the form of bands running in the same direction as, and connected in pairs by, through-membrane connections. The through-membrane electronic connections are created in bands along the electrolyte membrane, as described below. Each membrane is coated with a plurality of electrodes in this way forms a fuel cell board. When complete, these fuel cell boards are stacked alternately with insulating spacers formed of moulded plastics.

In order to deposit through-membrane electrical conductors, it is necessary to chemically deposit a metal or other electrically conductive material within the membrane. This material must be chemically stable within the membrane under fuel cell operating conditions, and may typically be a precious metal (e.g. Pt, Au, Ru, Ir, Rh, Pd) or an oxide of a precious metal. The general approach involves placing the membrane in a mask and exposing it to a precursor to the electrically conductive material. The precursor is allowed to diffuse into the membrane, following which the membrane is exposed to a reactant species which reacts with the precursor so as to cause the deposition of particles within the membrane material. This reactant species may be an acid or base, it may be an oxidant or reductant, or it may destabilize the complex containing the precursor. This second step 'fixes' the position of the through membrane conductor. The fixing step may also be electrochemical—two electrodes may be placed on either side of the membrane, and a current passed so as to induce reduction or oxidation of the precursor at the point at which the through-membrane electrical conductors are to be placed. The particles produced in the "fixing step" may or may not be electrically conducting. A post-treatment involving a further chemical species or treatment step may optionally be used to render those particles deposited in the membrane conductive or to improve the conductivity of the particles deposited (for instance, a chemical reductant may be applied to reduce a non-conducting precursor particle to a conducting state). The precursor introduction-fixing-post-treatment process may be repeated more than once to improve the conductivity of the through membrane connection.

A preferred method used to deposit conductive bands in the membrane will now be described. The membrane is placed into a mask before immersing it in a solution or allowing a solution to flow over it. The solution contains a metal complex, for example a gold- or platinum-complex (e.g. $Pt(NH_3)_4Cl_2$ or $AuCl_2$), in a high concentration. The metal ions/complex diffuse(s) into the membrane, in the regions where it is not protected by the mask. The metal-complex solution is then replaced by a solution containing a strong reductant in a high concentration (e.g. $NaBH_4$, or HCOOH). The reducing agent reduces the metal ions to their metallic state, leaving metal particles deposited in the membrane. These metal particles aggregate and are able to conduct electrical current.

Impregnation of the precious metal complex or salt into the membrane is dependent upon the concentration of the ions in the solution next to the membrane material, the diffusion coefficient of the molecule in the membrane material and the thickness of the membrane material. The temperature of the impregnation affects the diffusion coefficient of the ion which increases with increasing temperature.

The characteristic diffusion time for a distance L is: $\tau=L^2/D$, where D is the diffusion coefficient of the molecule in the ion exchange polymer. Therefore, assuming a diffusion coefficient of $10^{-6}$ cm$^2$ s$^{-1}$, a membrane thickness of 200 μm, and allowing the metal complex solution to diffuse in from both sides of the membrane, yields a characteristic time of 100 seconds. The membrane would normally be left for a multiple of the characteristic time in order to allow to system to reach equilibrium, therefore it would take approximately 250 seconds for the metal ions to impregnate the membrane material.

There is significant benefit in using a thinner membrane, as halving the membrane thickness quarters the characteristic time τ. Using the thin Nafion™ membranes which are common in modern fuel cell systems gives a characteristic time of around 20 seconds. Diffusion of the subsequent reactant requires an equivalent length of time to that required for the precious metal precursor, resulting in the cycle of impregnation, reduction and washing taking between 2 and 3 minutes. This process may be repeated several times in order to produce improved through-membrane contact.

To avoid the creation of very diffuse through-membrane connections, the metal complex may alternatively be reduced with an electron beam or a visible or UV light beam directed onto the electrolyte membrane, in the location where the through-membrane connection is required, resulting in a very well defined and precisely located through-membrane connection. This method has the added benefit that a mask is not necessary, as one could immerse the entire electrolyte membrane in the metal-complex solution, and selectively create the conducting through-connections.

Another alternative is to allow a composition containing a reducing agent, which is activated by visible or UV light, and the metal complex to diffuse into the electrolyte membrane. Thus when visible or UV light is shone onto the membrane, the metal ions are reduced. Precise, well-defined through-membrane connections can be formed either by placing the membrane into a mask before directing visible or UV light onto it, or without using a mask, by beam geometry.

Because electronic connectors are integrated into the membrane without compromising the integrity of the membrane, there is low risk of fuel mixing with oxygen.

Figure 8:
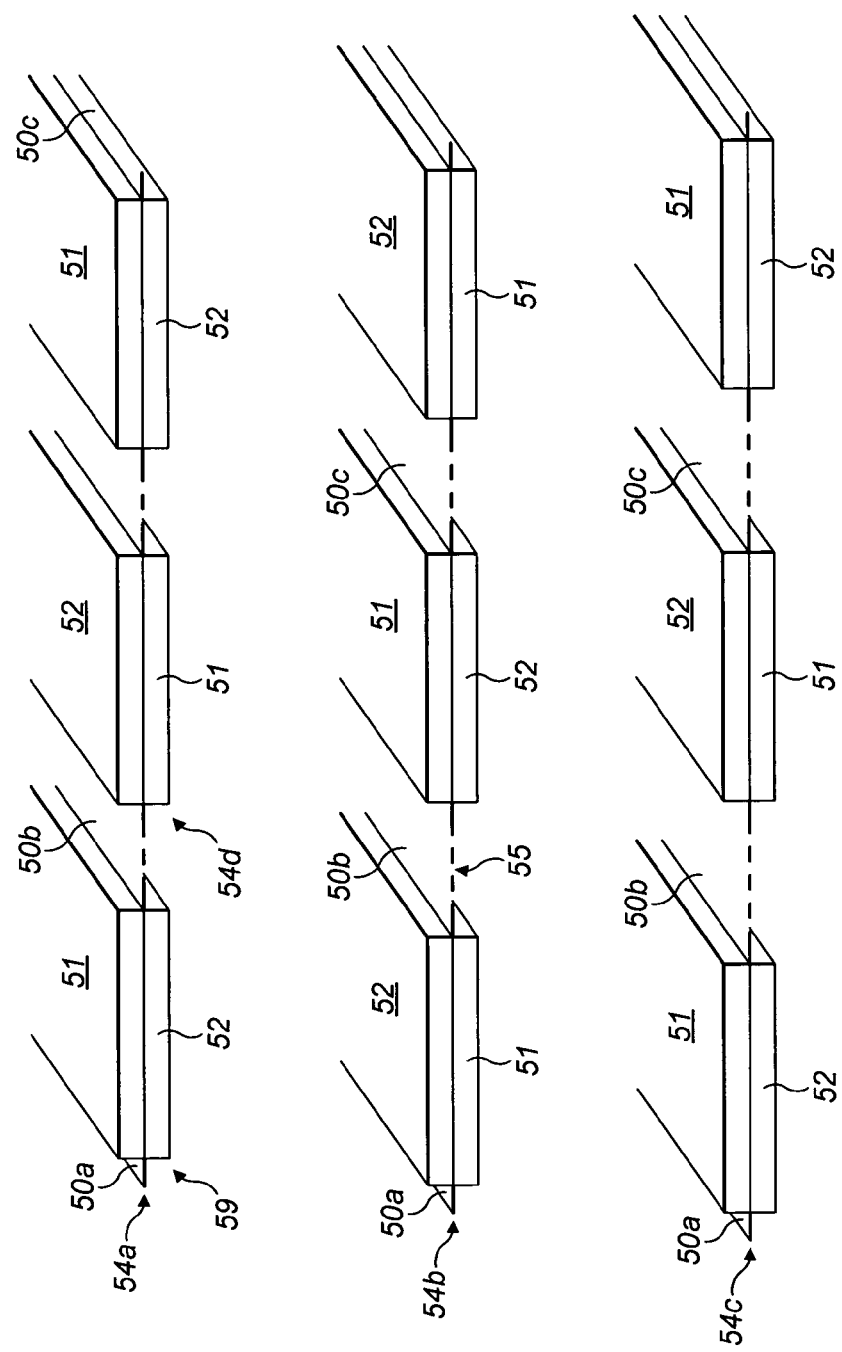
FIG. 8 shows an exploded view of a section of the fuel cell detailing the MEA layout of the second embodiment of the present invention.

In a second embodiment of the present invention, a fuel cell stack 40 is provided. A perspective, partial cut-away view is shown in FIG. 7 and is described in more detail in reference to FIG. 8. FIG. 8 shows an exploded view of a section of the fuel cell detailing the MEA layout. Each fuel cell board 41 of the fuel cell stack comprises a plurality of polymer electrolyte membranes 50a, 50b, 50c, etc., each of these membranes supporting an anode 51 and a cathode 52. Alternatively, each fuel cell board may comprise one single polymer electrolyte membranes, which supports a plurality of anodes and cathodes. This does not alter the mode of operation described below.

For clarity, the construction of the fuel cell boards and the fuel cell stack is described herein in terms of 'horizontal' and 'vertical' planes, in accordance with the embodiments illustrated in the Figures. However, these terms are used for clarity only, and are not limiting on the scope of the invention. It will be clear to the reader that the fuel cell boards can be arranged in any plane, not just the horizontal plane. Further, the term 'directly opposite' is not limited to the electrodes being in register.

The anode lies on one face of the polymer electrolyte and lies directly opposite a cathode on the opposite face of the same electrolyte membrane layer. Together, the anode, cathode and electrolyte layer form an MEA 59. In one (horizontal) plane, anodes on one face of a polymer electrolyte layer 50a are adjacent to cathodes on the same face of the adjacent electrolyte layer 50b. That is, in a horizontal plane, the sequence of anode and cathode positioning in adjacent MEAs alternates for each MEA. If one single polymer electrolyte membrane is used, the sequence of anodes and cathodes along each face alternates, with the respective cathodes and anodes on the opposite face also alternating.

Thus, each fuel cell board comprises an alternating sequence of anodes and cathodes on its two opposing faces. Anodes and cathodes on each face of the electrolyte membrane in a horizontal plane are separated by gaps 55. In the corresponding vertical plane, anodes on one MEA 54a face anodes of the adjacent MEA 54b, and cathodes on one MEA 54b face cathodes of the adjacent MEA 54c. Thus when a plurality of fuel cell boards are stacked together, pairs of adjacent anodes and pairs of adjacent cathodes alternate in the plane vertical to the singly alternating anodes and cathodes.

Figure 9:
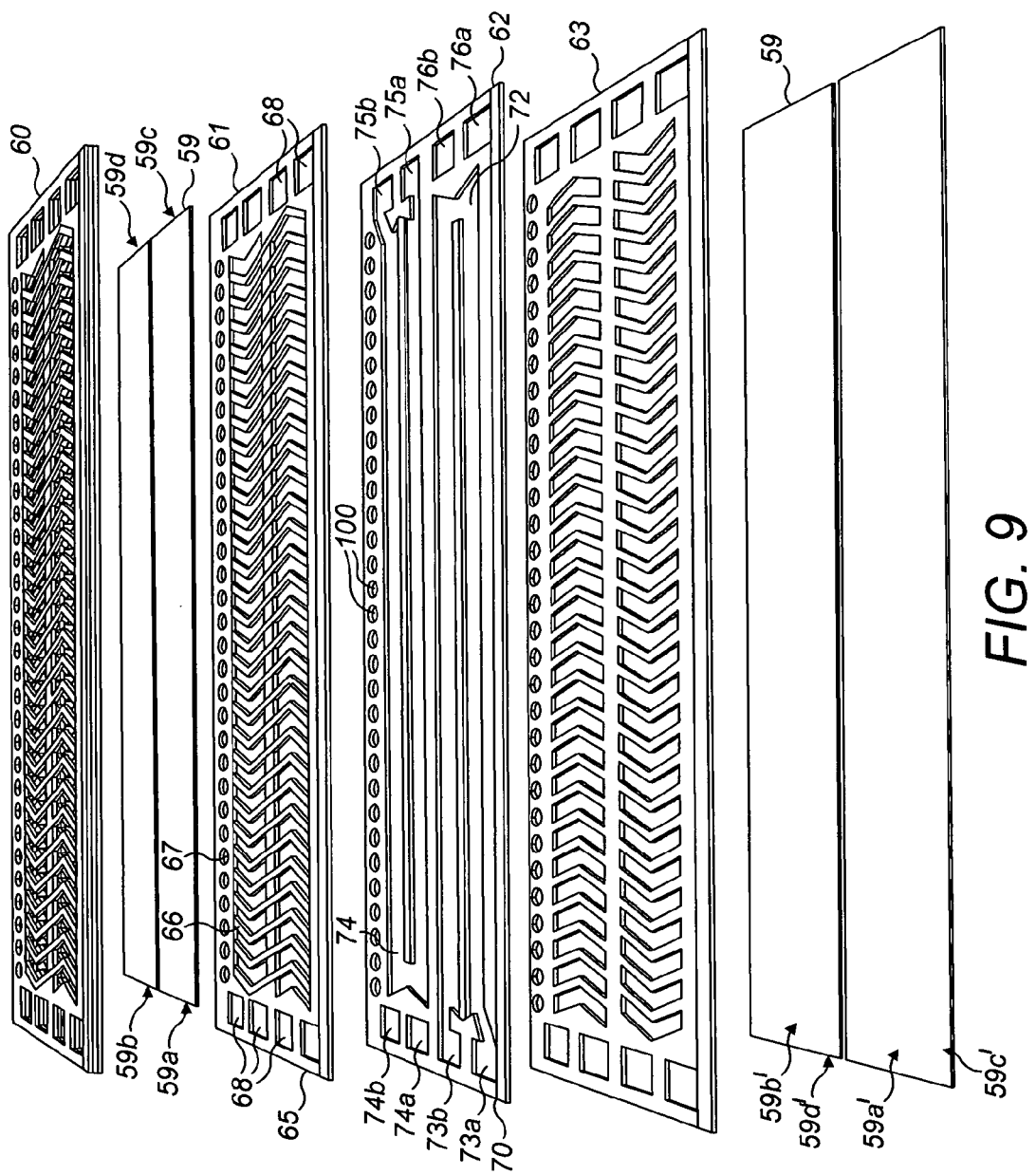
FIG. 9 shows an exploded view of the individual layers of the PCB board and MEAs of the second embodiment of the present invention.

As shown in FIG. 9, between each planar layer of MEAs 59, is a PCB board 60 that is made up of three individual layers. This PCB board comprises a first current collection and distribution layer 61, a reactant distribution layer 62, and a second current collection and distribution layer 63. These three layers are bonded together to form a single PCB board 60. By virtue of the current collection and distribution layer, current does not cross the electrolyte layer, but moves laterally from anode to cathode parallel to the horizontal plane of electrodes. Consequently, no through-membrane connections are necessary for the current to flow.

The individual layers of the PCB boards, i.e. the first and second current collection and distribution layers and the reactant distribution layers, are adhered together into a solid structure using an epoxy-containing glass fibre composite. The PCBs may be fabricated from pre-impregnated composite fibres, such that they contain an amount of the material used to bond the individual layers together and to bond the MEAs to the PCBs, or a pre-impregnated composite fibre mask may be applied to the PCBs. The MEAs may be laser bonded onto a PCB, thereby creating a fuel cell board 41. To create the fuel cell stack, a plurality of boards are laminated together. The gaps between the electrodes, and the sealing achieved in these gaps by the epoxy resin, prevent the fuel and oxidant gas flows from mixing, and prevent the fuel coming into contact with the cathode and the oxidant coming into contact with the anode, as described in more detail below. As this lamination step results in a solid structure, with good contact between the individual layers, the usually necessary heavy end boards become redundant. Accordingly, a monolithic, light, and completely sealed structure is produced. A simple PCB can be used as the end board.

When assembled into a fuel cell stack, an anode of a first MEA on a first fuel cell board lies vertically directly opposite an anode of a second MEA on a second fuel cell board, wherein the first and second fuel cell board are horizontally adjacent in the fuel cell stack. Similarly, a cathode of a first MEA, on a first fuel cell board, lies vertically directly opposite a cathode of a second MEA on a second fuel cell board, wherein the first and second fuel cell board are horizontally adjacent in the fuel cell stack.

The structure of a current collection and distribution layer 61 is shown in more detail in FIG. 9. FIG. 9 shows a section of the layer 61, corresponding to two adjacent MEAs 59. Referring to FIG. 9, the layer 61 consists of a frame 65, with panels of electrical distribution tracks 66 that link the anode 59a of one MEA to the cathode 59b of the vertically adjacent MEA. By virtue of the electrical distribution tracks of the current collection and distribution layer, the MEAs on each individual fuel cell board are connected in electrical series. As indicated by the arrows in FIG. 9, the anode 59a and cathode 59b are located on the underside of the MEA shown. The upper side of the MEA carries the corresponding cathode 59c and anode 59d, respectively.

Figure 10A:
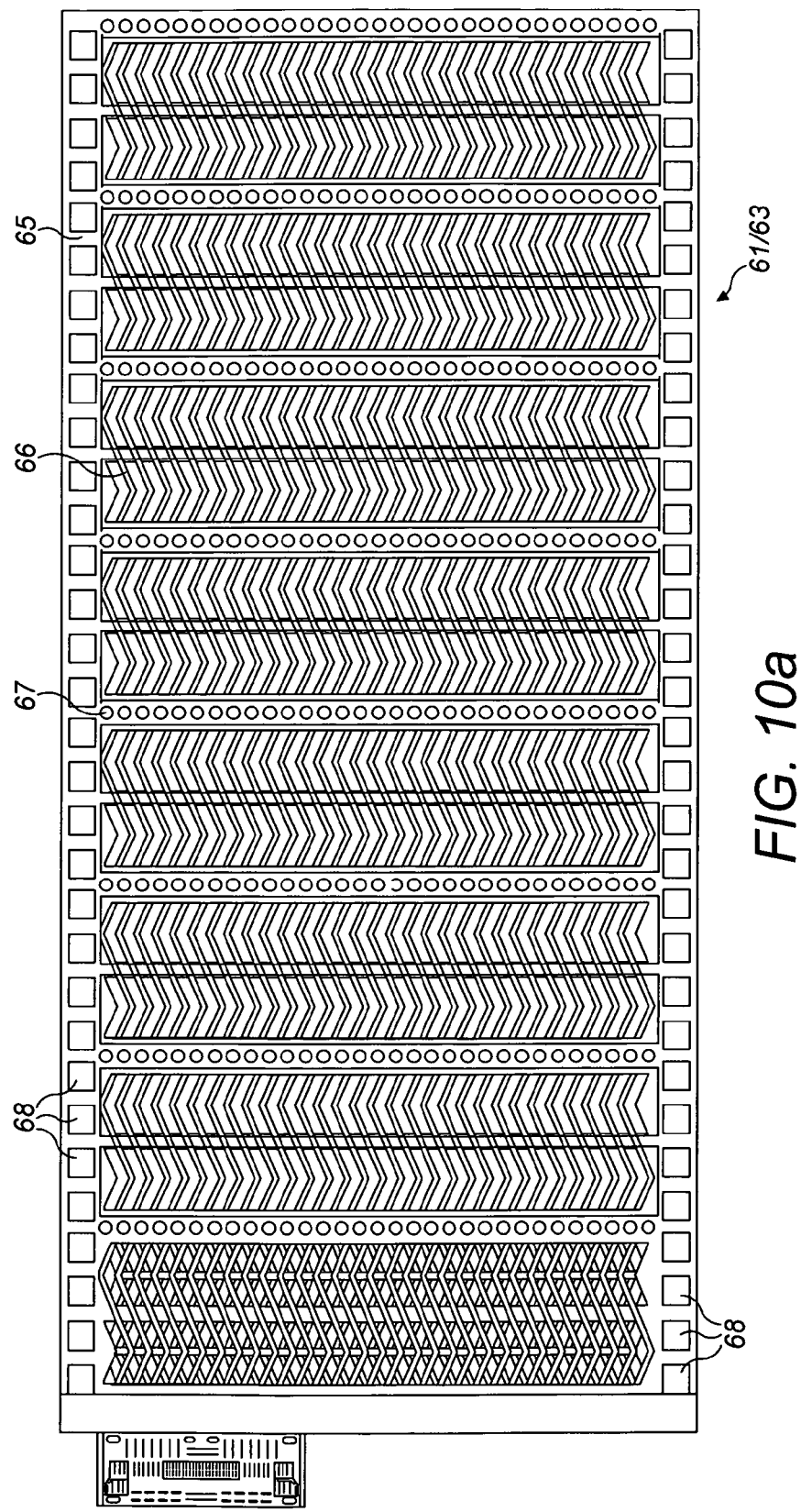
FIGS. 10 (a) and 10 (b) show a plan view of a current collection and distribution layer of the second embodiment of the present invention.
Figure 10B:
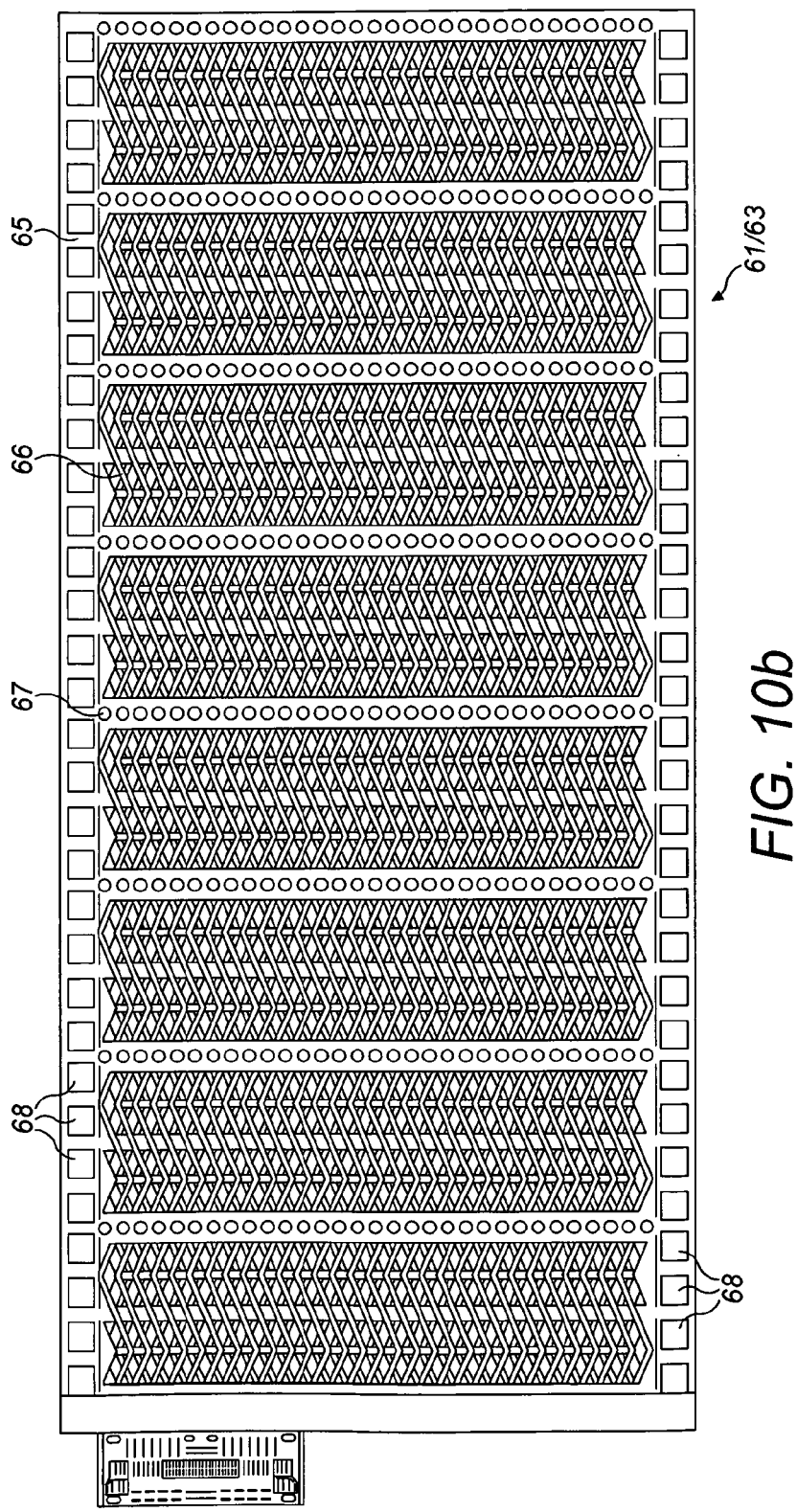

FIGS. 10a and 10b show a plan view of a current collection and distribution layer 61 for a planar layer of 16 MEAs. In FIG. 10b (and at the left hand side end of the layer shown in FIG. 10a), the plan view of a first and second current collection and distribution layer bonded together is shown. That is, the tracks 66 of the first and second current collection and distribution layer are visible. FIG. 10a (with the exception of the left hand side end of the layer) shows a plan view of only one current collection and distribution layer. Only a single layer of tracks is visible.

Holes 67 may be provided at regular intervals in the frame 65 to form part of an integral cooling system. These holes may form vertical cooling channels 42, as shown in FIG. 7. One or more fans 46 may be included to force the air into the cooling system.

The current collection and distribution layer 61 also includes holes 68 forming part of vertical reactant channels 43 (shown in FIG. 7), at the two opposed edges of the current distribution layer, adjacent to the narrow ends of the electrode bands.

These vertical channels 42, 43 are formed when the fuel cell boards 41 are stacked. In the embodiment shown in FIG. 7, the vertical fuel inlet and outlet channels run close to one edge 44 of the layer, and the vertical oxidant inlet and outlet channels run close to the opposite edge 45 of the layer. In the embodiment shown in FIGS. 7-12, there are two vertical fuel and oxidant channels per electrode. These vertical reactant channels connect with the channels provided in the reactant distribution layer.

Figure 11:
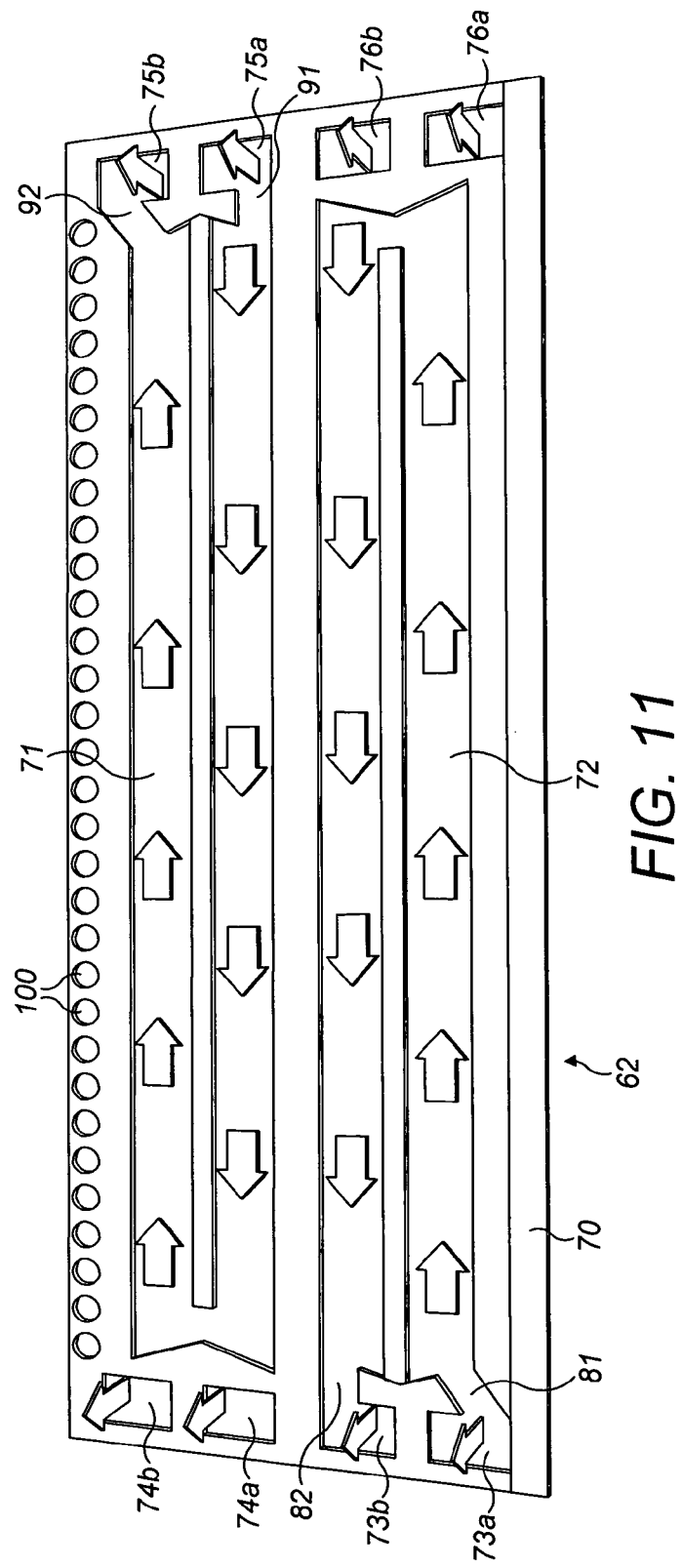
FIG. 11 shows a plan view of a reactant distribution layer of the second embodiment of the present invention.

The structure of a reactant distribution layer 62 is shown in detail in FIGS. 9 and 11, where a section of this layer 62, corresponding to two adjacent MEA 59 electrode pairs, is shown. This section is repeated, such that the number of reactant distribution channels corresponds to the number of MEAs or electrode pairs in the plane. The reactant distribution layer 62 comprises a frame 70, with two channels 71, 72, each forming a planar reactant distribution loop, and holes located close to two opposed edges of the frame, at the narrow ends of the distribution loops, forming vertical reactant channels.

Figure 12:
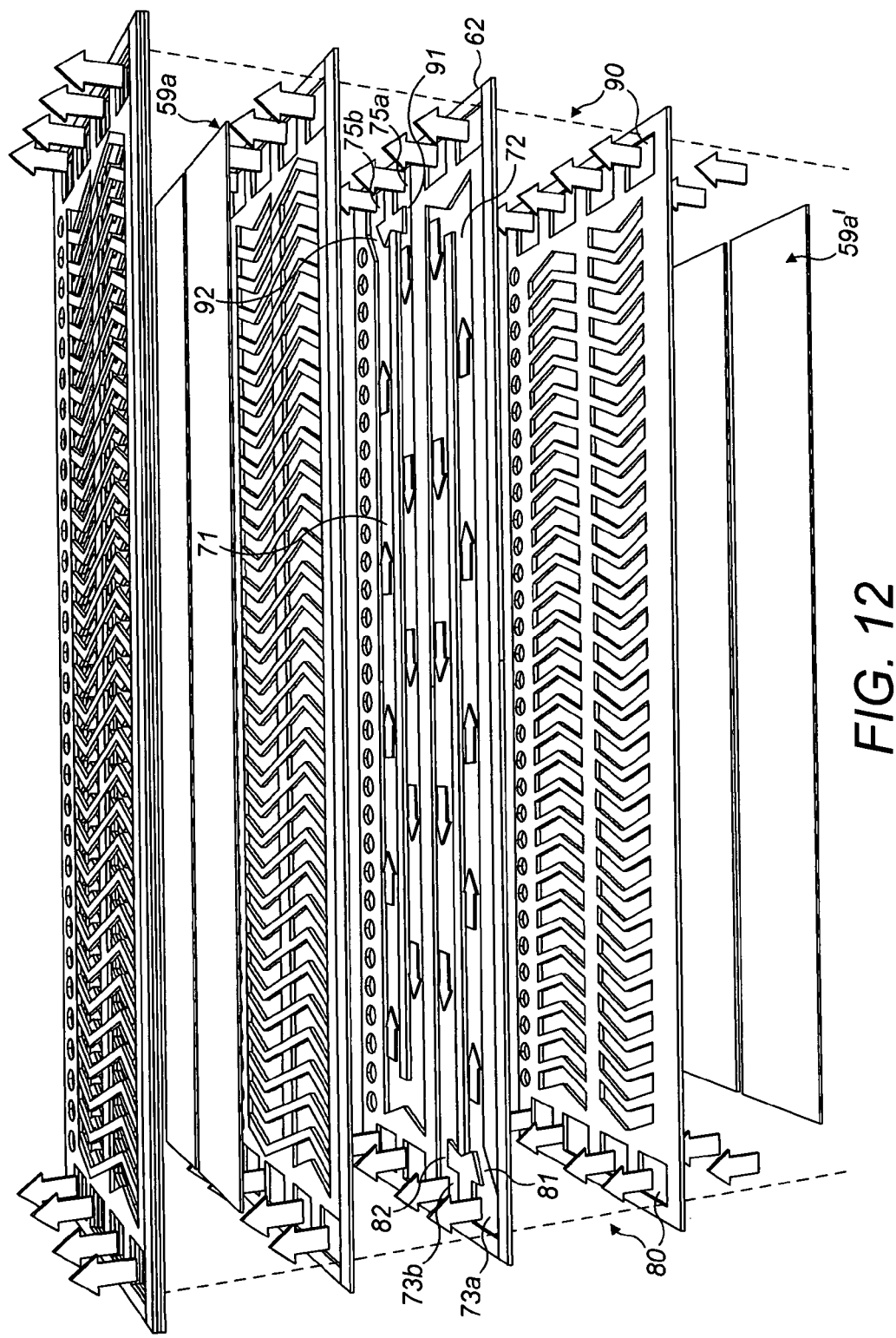
FIG. 12 shows an exploded view of the individual layers of the PCB board with reactant flow of the second embodiment of the present invention.

The holes along one edge of the frame 70 are sequentially inlet 73a, 74a and outlet 73b, 74b channels for a reactant, for example, a fuel, such as hydrogen and the holes along the opposite edge of the frame are sequentially inlet 75a, 76a and outlet 75b, 76b channels for a reactant, for example, an oxidant, such as oxygen or air. This is shown in FIGS. 9 and 12. The holes 73, 74, 75, 76 on the reactant distribution layer 62 line up with the holes 68 in the current collection and distribution layer 61 to create the vertical reactant distribution channels 43 shown in FIG. 7.

In the reactant distribution layer shown in FIG. 12, a reactant, for example a fuel, flows through the vertical channels 80 on one edge of the frame 70. When the location of the vertical channel corresponds to the location between two anodes 59a, 59a', the vertical channel is connected to the reactant distribution loop 72 of the reactant distribution layer 62. Accordingly, the fuel will flow from the vertical inlet channel 73a, into the entrance 81 of the distribution loop 72 of the reactant distribution layer, and along the faces of the anodes 59a, 59a' in the planes directly above and below the reactant distribution layer. The exit 82 of the distribution loop connects with the vertical fuel outlet channel 73b. The vertical channels 76a, 76b at the opposite edge of the frame, for example carrying the oxidant, are holes in the frame 70 that are not connected to the distribution loop 72.

In the planar adjacent MEA, the electrodes facing the distribution channel 71 are both cathodes 59b, 59b'. Accordingly, the layout of the distribution channel 71 associated with these electrodes is reversed: In the reactant distribution layer shown in FIGS. 9, 11 and 12, the oxidant flows through the vertical channels 90 on the right hand edge of the frame. When the location of the vertical channel corresponds to the location in the reactant distribution layer 62 between two cathodes 59b, 59b', the vertical channel is connected to the reactant distribution loop 71 of the reactant distribution layer 62. Accordingly, the oxidant flows from the vertical inlet channel 75a, into the entrance 91 of the distribution loop of the reactant distribution layer, and along the faces of the cathodes in the planes directly above and below the reactant distribution layer. The exit 92 of the distribution loop is adjacent to the entrance 91 of the distribution loop, and is connected to the vertical fuel outlet channel 75b that is adjacent to the vertical inlet channel 75a. The vertical channels 74a, 74b at the opposite edge of the frame, carrying the fuel, are not connected to the distribution loop 71.

In the adjacent fuel cell boards of the fuel cell stack, the sequence of anodes and cathodes is reversed. The reactant distribution channel layout thus alternates in sequence both in the horizontal and vertical plane, in order to supply vertically positioned pairs of anodes and cathodes with fuel and oxidant, respectively.

As in the first embodiment of the invention, the polymer electrolyte layer may be any electrolyte membrane, which allows ions (e.g. hydrogen ions) but not free electrons to pass through from one electrode to the other, for example, a sheet of Nafion™ membrane. The same preferred dimensions as described above for the first embodiment apply.

The reactant gas flows are kept separated by virtue of seals in the gaps between the electrodes of adjacent MEAs. These seals are achieved by impregnating the PCB boards with epoxy compounds, which are activated to create a tight seal upon lamination and boding with the MEA. If appropriate, further sealing may be incorporated by using seals made of PDMS, for example at the outer edges of a fuel cell board.

The vertical channels are connected to one or more reactant manifolds along the two opposed edges of the stack, which supplies and collects the reactants.

The frame of the reactant distribution layer may also comprise a series of holes 100 at regular intervals in the frame to form part of an integral cooling system, as described below.

The holes 67, 100 provided for the cooling system may be positioned between every electrode in a horizontal plane, or between every second, third, fourth, fifth, sixth, seventh, eight, ninth or tenth electrode, depending on the cooling required. The holes need not be at regular intervals between electrodes, but can be at any suitable interval.

In a third embodiment of the present invention, each fuel cell board 41 of the fuel cell stack comprises one or a plurality of polymer electrolyte membranes arranged in a plane. In a first alternative embodiment a) for each fuel cell board a series of individual membranes is aligned in a plane, with an anode on one face of the membrane and a cathode on the opposite side of the membrane. In a second alternative embodiment b) a single membrane is provided for each fuel cell board, with a series of anodes on one face of the membrane and a series of cathodes on the opposite side of the membrane. In both embodiments a) and b), all the anodes are positioned on one face of the one or more polymer electrolyte membranes in a horizontal plane, and all the cathodes are positioned on the opposite face of the one or more polymer electrolyte membranes in a horizontal plane. As in the second embodiment, anodes and cathodes lie directly opposite each other.

As in the first embodiment, in the third embodiment the fuel cell boards are stacked so that the anode-side faces of two adjacent fuel cell boards face each other, and the cathode-side faces of two adjacent fuel cell boards face each other. In this manner, the fuel can be delivered to all the anodes on two adjacent fuel cell boards, and the oxidant can be delivered to all the cathodes on two adjacent fuel cell boards, in a simple manner.

As in the second embodiment, in the third embodiment the MEAs are bonded onto a PCB board made of three separate layers, to form a fuel cell board. In the fuel cell stack, each planar series of MEAs is located between two PCB boards. Reactant delivery to the electrodes is achieved by the reactant distribution layer of the PCB board, as described for the second embodiment. Thus, the electrically insulating spacer of the first embodiment (by reference to FIGS. 3 and 4, each spacer 20) is replaced by a PCB layer.

As for the second embodiment, in the third embodiment, heavy end plates are not necessary, as the fuel cell boards are laminated together into a solid structure. A simple PCB can be used instead of the heavy end board.

In embodiment a) of the third embodiment, in which each fuel cell board comprises a series of individual membranes, the electrical connections between anodes and cathodes are made either through the gaps between the membranes, as holes can easily be machined into the PCB boards, or by externally connecting the current collection layer of the PCB board of the anode side to the current distribution layer of the PCB board of the cathode side.

In embodiment b) of the third embodiment, in which a single membrane is provided for each fuel cell board, the electrical connections between anodes and cathodes are made either by through-membrane connections, as described for embodiment 1, or by externally connecting the current collection layer of the PCB board of the anode side to the current distribution layer of the PCB board of the cathode side.

The PCB reactant distribution layer is described in more detail with reference to the second embodiment of this invention. However, due to the different layout of anodes and cathodes in the third embodiment, the current collection and distribution layers are not required when the electrical connection is made via through-membrane connections or when electrical connections are made through the PCB board. When the electrical connection is made by externally connecting the PCB boards of the anode side to the PCB boards of the cathode side, the PCB boards facing the anodes will have a first and a second current collection layer, separated by a reactant distribution layer and the PCB boards facing the cathodes will have a first and a second current distribution layer, separated by a reactant distribution layer. The connections are made between the anode of a first MEA and the cathode of a second MEA, between the anode of a second MEA and the cathode of a third MEA, and so forth, depending on the number of electrode pairs on the fuel cell board.

Figure 13A:
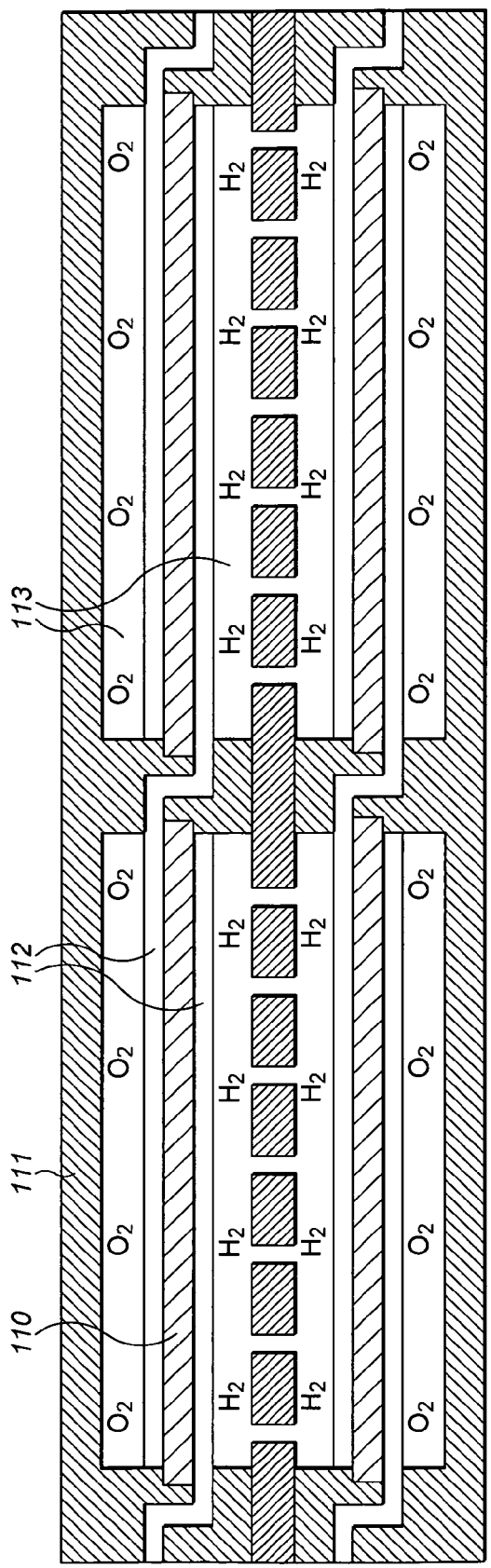
FIGS. 13 (a) and 13 (b) show a cross sectional view of the third embodiment of the present invention.
Figure 13B:
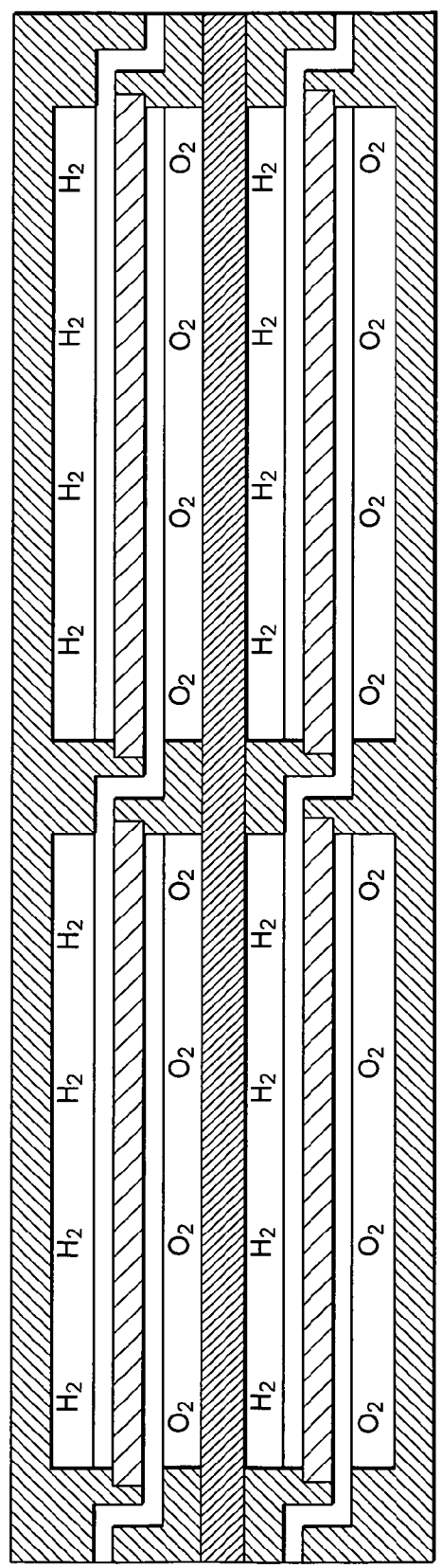
Figure 13C:
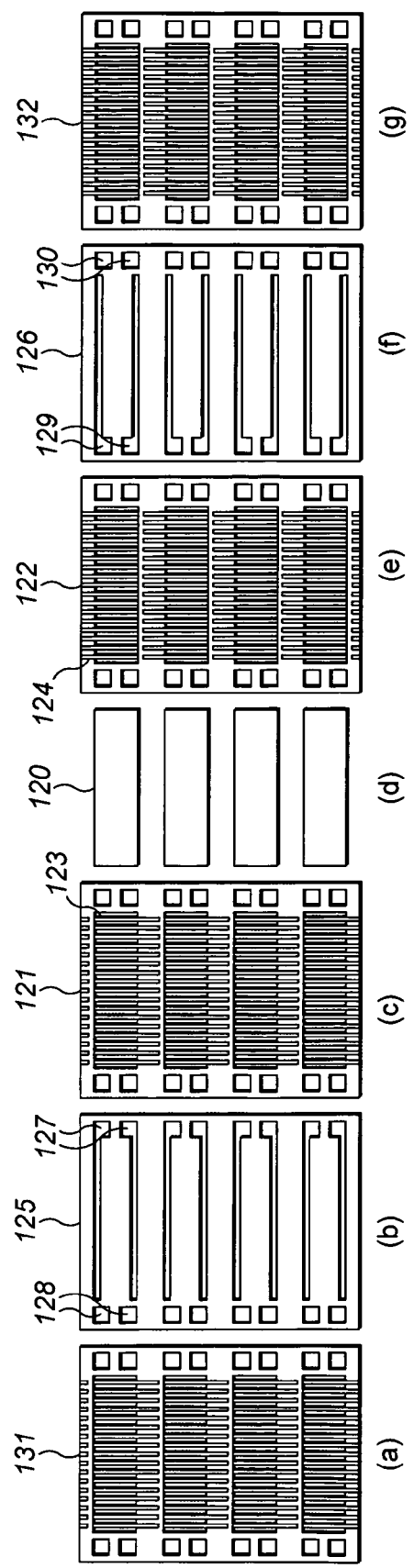

FIG. 13 (a) shows two layers of a fuel cell stack, comprising an MEA 110, PCB material 111, an electrically conducting layer 112 that conducts the current from the anode of a first cell to the cathode of the next cell, and reactant distribution channels 113 to carry the reactants to the electrodes.

FIG. 13 (b) shows an alternative layout.

FIG. 13 (c) shows an extract of the fuel cell structure, with one set of fuel cell electrodes sandwiched between two sets of three separate boards. The individual subsections are laminated together. Four fuel cell electrodes 120 are configured in electrical series. Adjacent to the cathode side is a lower cathode contact board 121 and an upper anode contact board 122. The contact boards have slots cut into them so that reactant from the inlet channel can flow to the outlet channel. The boards carry conducting bars 123, 124 that carry the current laterally. In FIG. 13 (c) the cathode board is shown with the conductor layer facing up, whereas in reality the conductors would face towards the electrodes 120. Adjacent to the lower cathode contact board 121 is an inner air distribution layer 125. This layer has sets of inlet and outlet channels 127 for the air (oxygen), and holes for the hydrogen inlet and outlet channels 128. Each channel flows to the corresponding reactant plenum. Adjacent to the upper anode contact board 122 is an inner hydrogen distribution layer 126, comprising hydrogen inlet and outlet channels 129 and air inlet and outlet channels 130. Adjacent to the inner air distribution layer 125 is an upper cathode contact board 131 and Adjacent to the inner hydrogen distribution layer 126 is a lower anode contact layer 132. The contacts on the lower side of the lower cathode contact board 121 are designed to connect to the connectors of the upper anode contact board 122, placing the MEAs 120 in electrical series.

As in the first embodiment of the invention, the polymer electrolyte layer may be any electrolyte membrane that allows ions (e.g. hydrogen ions) but not free electrons to pass through from one electrode to the other, for example, a sheet of Nafion™ membrane, and the same preferred dimensions apply, with the proviso that the membrane may be provided in individual sections, rather than in one complete piece.

PCB technology (or other similar technology) is used to manufacture elements of the fuel cell stack of the second and third embodiment. This enables the elements to be manufactured in large quantities and at low cost. For example, multiple flow field boards can be manufactured at the same time, by using thin laminate boards which are stacked and then simultaneously routed. Individually routed boards are then stacked and laminated together.

PCBs for the present invention are produced in the known way. Insulating layers may be made of dielectric substrates such as FR-1, FR-2, FR-3, FR-4, FR-5, FR-6, CEM-1, CEM-2, CEM-3, CEM-4, CEM-5, polytetrafluoroethylene, and G-10, which are laminated together with an epoxy resin prepreg. In order to yield conductive areas, a thin layer of copper is either applied to the whole insulating substrate and etched away using a mask to retain the desired conductive pattern, or applied by electroplating.

Each individual layer of the PCB board is 30 µm-2 mm thick, preferably 50 µm-1 mm thick, more preferably 0.1 mm-0.8 mm thick, most preferably about 0.4 mm thick. Each PCB board is thus 90 µm-6 mm thick, preferably 150 µm-3 mm thick, more preferably 0.3 mm-2.4 cm thick, most preferably about 1.2 cm thick. The electrode layer is 0.1 mm-1 mm thick, preferably 0.3-0.6 mm thick, more preferably 0.4 mm thick. Thus the cell pitch is preferably 1.6 mm thick (1.2+0.4 mm), thus allowing 16 cells per inch.

For the first, second and third embodiment of the present invention, the electrode bands are 1 mm-5 cm in width, preferably 5 mm-15 mm in width, more preferably about 1 cm in width. The size of the gaps between the electrode bands is dependent on whether they accommodate cooling channels. The gaps between the electrode bands with a cooling channel are between 1 mm-1.5 cm wide, preferably between 2 mm and 1.2 cm wide, more preferably between 5 mm and 1 cm wide. The gaps between the electrode bands without a cooling channel are between 0.5 mm-1 cm wide, preferably between 2 mm and 8 mm wide, more preferably between 3 mm and 6 mm wide.

For the first, second and third embodiment of the present invention, a catalyst layer is preferably provided on the electrodes. This layer may be made of suitable catalytic material for the reactions of interest, as is commonly understood by a researcher skilled in the art of producing fuel cells. For example, the catalyst layer may be composed of platinum nanoparticles deposited on carbon and bound with an proton conducting polymer (e.g. Nafion™), as described in "PEM Fuel Cell Electrocatalysts and Catalyst Layers Fundamentals and Applications", Jiujun Zhang (Ed.), 1st Edition., 2008, XXII, 1137 p. 489 illus., Springer-Verlag London, ISBN: 978-1-84800-935-6.

A gas diffusion layer may be included adjacent to the catalyst layer. The gas diffusion layer may be fabricated or deposited in any appropriate manner as will be familiar to the skilled reader. For example, the gas diffusion layer in a typical fuel cell is composed of carbon in one of a number of forms mixed with a number of binders and additives to modify the wetting characteristics of the layers. Typically the gas diffusion layer adjacent to the catalyst layer is composed of a microporous layer of carbon powder bound with PolyTetraFluoroEthylene (PTFE) (this layer has very small pores). Adjacent to this microporous layer is a further backing layer, typically composed of carbon fibers—either woven into a cloth, or bound together in some form of non-woven material, such as a paper. This layer has pores of a larger size. The combination of these two layers provides a gradation in pore size in moving from the gas-channel to the catalyst layer. Sometimes rather than two discrete layers, the microporous layer and the porous backing layer interpenetrate.

Typically the thickness of the gas diffusion layer is around 100-1000 μm. In commonly used modern fuel cells, the choice of carbon as the major constituent of the gas diffusion layer is dictated by the further constraint that electrical current must be conducted from the catalyst layer to the ribs of the bipolar plate. Most other materials that might be used are either not sufficiently corrosion resistant (many other metals), or are too expensive (gold, platinum etc.)

In the design of the current invention, the gas diffusion layer may be composed of the same materials i.e. carbon powder and/or fibers bound together with a suitable binder and treated with a suitable chemical to modify its hydrophilicity. However, because transport to electrons in a direction normal to the surface of the electrode is not required, the gas diffusion layer may alternatively be composed of non electrically conducting materials which nonetheless have suitable properties. The exact nature and electrical conducting properties are dictated by the electrical conductivity requirements of the surface layer—because current must be conducted along the surface of the MEA, requiring a high enough value of the electrical conductivity so that ohmic loss (surface current·layer resistance) is small (i.e. <10-20 mV).

Examples of material out of which the gas diffusion layer can be composed are porous forms of the following: inorganic oxides ($Al_2O_3$, $SiO_2$); plastics: (ptfe, poly ethylene, poly sulfones, etc); other inorganic materials: nitrides, carbides, phosphates, sulphates etc. In some cases, e.g. for thick catalyst layers, the catalyst layer may provide sufficient electrical conduction itself—in this case the gas diffusion layer does not need to be electrically conducting and may even be omitted. In other cases it may be necessary to have some of the current carried through the gas diffusion layer, in which case it would need to be composed (at least partially) from carbon or other electrically conducting material. In all cases, the gas diffusion layer can be made to be quite thin, for example, less than 100 μm, more preferably less than 25 μm. A thinner gas diffusion layer enhances transport of reactants to and from the catalyst layer.

Under typical operating conditions, it is necessary to provide a cooling mechanism to prevent the fuel cell form overheating. Cooling plates are used in some known fuel cells and can be incorporated into the fuel cell stacks of the present invention. However, the thickness of these plates limits the density of the fuel cell. Cooling of the fuel cell stacks of the first, second and third embodiment of the invention may be effected by inclusion of one or more of cooling plates, cooling channels and/or heat pipes. Further, the PCB boards of the second and third embodiments may further incorporate a coolant channel.

In the second and third embodiments of the present invention, integral cooling of the fuel cell stack is simple due to PCB technology (holes). Air or water cooling, or heat pipes can be used. For example, fans for air cooling may be provided, pushing air into a plenum, which forces air into, for example, vertical channels running through the fuel cell stack. These cooling channels are the result of horizontally stacking the boards with holes in their frames, as described above. Heat pipes may be used in combination with, or in place of, the cooling channels.

Heat pipes are described in detail in "An introduction to heat pipes: modeling, testing, and applications", G. P. Peterson, Wiley, New York, 1994, ISBN 047130512X. A heat pipe is a sealed hollow tube made of a material with high thermal conductivity at both ends, filled with a fraction of a percent by volume of a working fluid (or coolant), forming a closed-loop capillary recirculation system. Heat pipes operate when there is a temperature difference between the two ends of the pipe, by employing evaporative cooling to transfer thermal energy from one end of the pipe to the other by the evaporation and condensation of a working fluid or coolant. Alternatively, flat, planar heat pipes may be used.

Each fuel cell board of the first, second and third embodiment of the present invention is connected via its first cathode and its last anode to an external circuit. These electrical connections are fabricated by known means. The switching mechanism, such as an FET switch, and possibly a voltage measuring apparatus of any appropriate known type, are incorporated into the fuel cell board. The voltage measuring apparatus allows quick and simple monitoring of the voltage output of each fuel cell board when it is either connected or disconnected from the stack bus-bar. This voltage measurement is then used to adjust the load pattern of the fuel cell boards, as described below. The switch is located between the electrical connection of an electrode and the stack bus bar and the voltage measuring apparatus is connected to the first cathode and the last anode of each fuel cell board. Individual control lines are used to operate each of the switches.

In operation, the fuel cell is enclosed in a housing and is sealed from the atmosphere. Reactants are fed into the fuel cell channels through sealed connections. Seals may, for example, be made of PDMS. In particular, fuel (e.g. $H_2$) and oxidant (e.g. $O_2$) are fed into appropriate channels of the fuel cell stack, with fuel being supplied to the anodes and oxidant to the cathodes. The electrical current thus formed can be taken directly or the output of the fuel cell board can be modulated utilising the aforementioned switch. Modulating the output of the fuel cell board may result in a significantly improved performance when the cell is operating on reformate or methanol (in a Direct Methanol Fuel Cell) or other fuels which result in poisoning of the fuel cell over time.

A constant power output of the stack may be achieved in a variety of ways. For example, all fuel cell boards may be loaded at all times. Alternatively, the fuel cell boards may be divided into groups and these groups may be "switched on" in turn in a synchronous manner (i.e. switching occurs at a defined time for all fuel cell boards). The fuel cell boards may also be switched in an asynchronous or quasi-asynchronous manner—i.e. each fuel cell board is connected and disconnected to the load for a defined period and frequency individually specified for each fuel cell board. By switching the fuel cell boards so that they are only connected to the load for a proportion of the time according to a duty cycle, the output power of the stack can be continuously modified. For example, if over a given sample period of time only 50% of the fuel cell boards are connected to the load, then the output power of the fuel cell stack will be similarly reduced. The manner in which this 50% is achieved may be brought about in a multitude of ways—for example half of the fuel cell boards may be disconnected from the load and half connected for the entire period; alternatively all fuel cell boards may be connected to the load, but each connected for only half of the sample period. Alternatively again, half of the fuel cell boards may be connected to the load for one quarter of the sample period, and the other half for three quarters of the sample period etc. The choice of the specific scheme or duty cycle used may depend on the performance of individual fuel cell boards, the need to avoid localized heating or 'hot spots', the need to avoid flooding of cathode sites with product water, the need to prevent dehydration of the membrane, or the need to counteract poisoning of the electrodes. It will be noted that the duty cycle may be predetermined or may be controlled in real time based on monitored performance of the fuel cell, for example in a closed feedback loop with the voltage measuring apparatus described above. Part-time use of fuel cell boards may also improve efficiency as one can achieve optimum load conditions and power conversion for each individual fuel cell board rather than for the fuel cell stack which is a limitation of current designs. By including additional switching and filtering components on the fuel cell boards, a smoothly varying output, for example a sinusoidal wave, may be obtained, in addition to simple "changeovers" or steps from one potential to another.

In the case of failure of a fuel cell board, the failed fuel cell board may be switched out altogether. This may also be performed in advance of the failure on the basis of diagnostics or predictive models.

Each fuel cell board can carry its own electronic circuitry, with each module feeding the power into an electrical bus. That is, each board contains its own power electronics and controller. The latter monitors the performance of the fuel cell electrodes, local humidity and temperature. It can also control the shape memory alloy (SMA) valves to throttle the flow of reactant to the electrodes on that board, as described in more detail below. Thus the power electronics can be put directly onto each horizontal board. In this manner, the status of each electrode can be monitored for degradation. This information gives feedback to enable the electronics to be modulated so a particular board of electrodes can be used less, thereby slowing the degradation process, or by completely shutting down a board of electrodes. This control enables the protection of underperforming boards, thereby increasing the longevity of the entire fuel cell stack.

A further benefit of having electronics directly on each board is that they can each be configured to convey power in a different way. One example is to use the fuel cell to work multiphase electric motors and provide current to different coils at different times, thereby increasing the efficiency, increasing control of performance and increasing control at low torque. Each of the horizontal boards comprising the series of electrodes would drive one phase.

Figure 14:
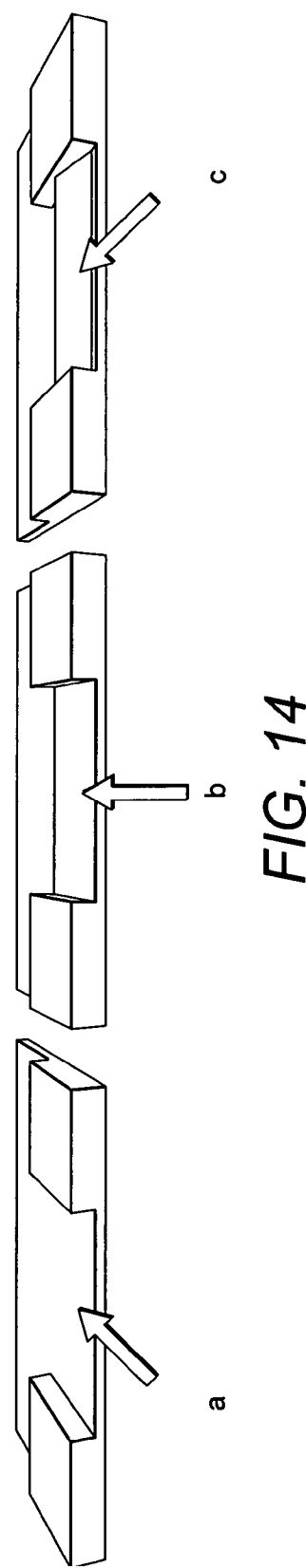
FIG. 14 shows the lower half of a reactant channel and illustrates the use of a Shape Memory Alloy (SMA) as a low profile valve.

If, for example, an electrode is underperforming or has become faulty, it is not only possible to switch out the affected board using the individual electronics, but it is also possible to stop the fuel or oxidant supply to specific electrodes. In such a case, it is preferable to particularly stop the flow of hydrogen through cells that have been shut off. Stopping the gas flow is difficult, due to the low profile gas inlet. However, it has been found that the gas flow through the inlet may be blocked by using a Shape Memory Alloy (SMA) as a low profile valve. A Shape Memory Alloy is a metal alloy that deforms in response to the application of temperature (e.g. heat) or an electromagnetic field (e.g. application of current), and returns to its original shape after the application of e.g. heat or current ceases. This is described in reference to FIG. 14, which shows three views of the lower half of a reactant channel (the top half is not shown for clarity). FIG. 14(a) shows the reactant-inlet valve open. The arrow indicates where reactant flow occurs. The SMA may be either a foil which distorts on heating to close off the channel, as shown in FIG. 14(b), or it may be in the form of a wire attached to a flap, where the wire changes shape upon heating, thereby drawing an object, for example a flap, which closes the channel, as shown in FIG. 14(c). SMAs that may be used in the present invention include nickel-titanium, copper-aluminium-nickel, copper-zinc-aluminium, and iron-manganese-silicon alloys. Preferably the SMA used is a nickel-titanium alloy.

The fuel cell of the present invention comprises at least two fuel cell boards, each fuel cell board may comprise either
a) one membrane of substantially gas impervious electrolyte material supporting at least two anodes on a first face of the membrane and two cathodes on a second face of the membrane; or
b) at least two membranes of substantially gas impervious electrolyte material, each supporting one anode on a first face of the membrane and one cathode on a second face of the membrane.

Preferably, the fuel cell comprises at least three fuel cell boards. More preferably the fuel cell comprises between four and fifty fuel cell boards, for example, eight, ten, sixteen or twenty fuel cell boards.

Preferably each fuel cell board comprises either
a) one membrane of substantially gas impervious electrolyte material supporting at least three anodes on a first face of the membrane and three cathodes on a second face of the membrane; or
b) at least three membranes of substantially gas impervious electrolyte material, each supporting one anode on a first face of the membrane and one cathode on a second face of the membrane.

More preferably each fuel cell board comprises either
a) one membrane of substantially gas impervious electrolyte material supporting at least three anodes on a first face of the membrane and three cathodes on a second face of the membrane; for example, at least four anodes on a first face of the membrane and four cathodes on a second face of the membrane, for example, at least ten anodes on a first face of the membrane and ten cathodes on a second face of the membrane, for example, at least sixteen anodes on a first face of the membrane and sixteen cathodes on a second face of the membrane, for example, at least twenty anodes on a first face of the membrane and twenty cathodes on a second face of the membrane; or
b) at least three membranes of substantially gas impervious electrolyte material, each supporting one anode on a first face of the membrane and one cathode on a second face of the membrane; for example, at least four membranes of substantially gas impervious electrolyte material, each supporting one anode on a first face of the membrane and one cathode on a second face of the membrane, for example, at least ten membranes of substantially gas impervious electrolyte material, each supporting one anode on a first face of the membrane and one cathode on a second face of the membrane, for example, at least sixteen membranes of substantially gas impervious electrolyte material, each supporting one anode on a first face of the membrane and one cathode on a second face of the membrane, for example, at least twenty membranes of substantially gas impervious electrolyte material, each supporting one anode on a first face of the membrane and one cathode on a second face of the membrane.

When the current is conducted by means of a current collection and distribution layer, the surface area of an electrode on a membrane, or on the at least two membranes, should substantially correspond to the dimensions of a reactant distribution channel on a reactant distribution layer, and to the size of a panel of electrical distribution tracks on the current collection and distribution layer, or to the size of a panel on the current collection layer and the current distribution layer, depending on the specific embodiment. Preferably, the surface area of an electrode will be such that as much of its surface area as possible is in contact with a reactant distribution channel.

The flexible characteristics of the present invention make it suitable for use in applications which require a high degree of resilience and fault tolerance, along with a high power density. For instance it may be used within a stationary power supply system which is required to work for long periods without manual intervention, or for applications which require operation under degraded conditions due to partial damage.

Because of the ability to monitor the fuel cell for degradation and switch out a whole plate containing a faulty electrode, electrodes can be built to a lower tolerance than possible for known fuel cells. This in turn lowers the cost of manufacturing the fuel cells of the present invention compared to known fuel cells.

Thus all embodiments of the present invention have the advantages of easily separating the fuel and air flows, resulting in a simpler, cheaper system, and the ability to monitor the operating status (e.g. degradation) of each element of the fuel cell stack and to independently control elements of the fuel cell stack.

It will be appreciated that aspects of the invention can be interchanged or juxtaposed as appropriate. The fuel used is not restricted to hydrogen, but may be any suitable fuel. For example, the new geometry fuel cell stack described herein is also applicable to methanol used in Direct Methanol fuel cells. The electrodes deposited on the membrane need not be straight bands, but may be any appropriate shape e.g. they may be curved, or their width may vary with position. Similarly, any of the cooling or gas diffusion channels need not be straight, and may for example be of a serpentine design. Also, the first embodiment of the invention is not limited to having only one cooling or gas diffusion channel in each spacer.

The membrane material is not limited to Nafion™, and any suitable ion-exchange electrolyte, such as a fluoropolymer sulfonic acid membrane may be employed.

In the first embodiment, the spacer between the stacked sheets may be plastic, but any suitable electrically insulating material may be used. Channels in the surface on either face of the spacer need not line up or be of equal dimensions.

The switch mechanism for controlling the electronics of the fuel cell board is not restricted to FET-type switches; any suitable switch, such as a junction transistor, may be used.

Whereas gold or platinum metal complex containing solutions are preferred for the fabrication of the through-membrane electronic connectors, any suitable precious-metal or suitable compound may be used. The catalyst is preferably Pt or a Pt-alloy and is optionally supported onto carbon, but is not limited to these examples.

A further aspect of the present invention relates to a corrosion resistant coating that may be applied in the first, second and third embodiments of the invention. This coating is used to passivate the copper surface of the PCB and stop the copper layer from corroding. This is important because the conditions in a fuel cell are very acidic and oxidizing, under which conditions copper corrodes. If the copper is oxidized from $Cu^0$ to $Cu^{2+}$, this leads to the disintegration of the copper surface of the PCB, and the consequently, the fuel cell.

Accordingly, a coating is needed that prevents $H_2O$ from reaching the copper surface of the PCB, but still allows good electrical conduction. The copper surface of the PCB may for example be the current collection and/or distribution layer or 'plate'. The coating must be stable and must not undergo any electrochemical or chemical degradation within the fuel cell environment. At the same time the material must be hard-wearing, as it must not become detached from the copper surface. It is important that the coating does not have any cracks or holes in it that would allow water ingress.

Three different approaches to achieve these effects are detailed below. A combination of two or all three approaches is also considered herein, in order to achieve the best performance.

In a first approach, the copper layer is coated with an ink or paint composed of electrically conductive particles. These particles must be passive and must not undergo significant oxidative or acidic corrosion.

Examples of suitable particles include carbon (in the form of graphite particles) or electrically conductive titanium suboxide, for example, $Ti_4O_7$, obtainable commercially as Ebonex®. Other materials may also be considered, for instance $Ti_{0.9}Nb_{0.1}O_2$, which may be more resistant to corrosion, doped tin oxide (doped with antimony, fluorine, or indium to improve conductivity), or an ink composed of electrically conductive polymer particles. Examples of suitable polymers include polyaniline, polypyrrole, polythiophene and poly(3,4-ethylenedioxythiophene) (PEDOT).

Carbon inks for coating copper tracks for PCBs are known and commercially available.

An ink is obtained by mixing the conductive compound, for example graphite, or the titanium, or tin compounds described above, with a solvent and a polymeric binder to form a slurry, or ink. The concentration of particles used in the ink is typically a volume fraction of greater than 20 vol %, for example, between 20 vol % and 70 vol %, for example, between 20 vol % and 60 vol %. This volume fraction is selected in order to enable good particle-particle contact, for conductivity, and also to contain sufficient binder to create a stable coating layer. The particles make up the conductive phase of the coating layer when the ink is coated onto a substrate. The polymeric binder may be any suitable polymer, for example, polyethylene, or an epoxide polymer, such as a thermosetting epoxy polymer.

Inks containing conductive polymers are used in the electronics industry for displays, although they have not previously been used in fuel cell current collection plates. The term 'current collection plate' is used to encompass a range of components in the fuel cell which may also be called bipolar plate, monopolar or unipolar current collector, gas diffusion layer, gas transport layer etc.

The other materials exemplified above are not known in the field of inks or passivating coating layers for PCBs and fuel cell current collection and/or distribution layers or plates.

A second approach involves direct electrodeposition of an electrically conducting polymer onto the copper surface of the PCB. There are many possible polymers which can be considered including polyaniline, polypyrrole, polythiophene and poly(3,4-ethylenedioxythiophene) (PEDOT).

Stabilisation of the polymer to electrochemical oxidation and reduction and improvement in electrical conductivity may be achieved by incorporating a polymeric anionically charged polymer such as poly(styrenesulfonate) or Nafion®.

The use of such electrically conducting polymers has been considered within fuel cells before, predominantly within the catalyst layer. The use of these materials as corrosion protection layers in general has been disclosed in the literature, but there has been no disclosure regarding the use of these materials as corrosion protection layers in fuel cells.

The Applicant has examined the use of fluorinated polymer derivatives as an electrically conductive corrosion resistant layer and discovered that fluorinating the polymer by adding a pendant pefluoro alkyl chain increases the surface energy of the resulting coating and makes it water repellent. This reduces the likelihood of corrosion. Higher surface energies also lead to better wear resistance due to decreased friction.

In a preferred embodiment, the conducting polymer is chosen such that it has a high fluorine content, for example, wherein the polymer comprises a perfluorinated alkyl chain.

PEDOT has previously been considered as a passivating layer because of its stability and high electrical conductivity. The Applicant has examined fluorinated PEDOT as a passivating layer directly electrodeposited onto a fuel cell current collection and/or distribution layer or plate.

A method of producing the EDOT monomer and its polymerisation are described in Benedetto et al., *Electrochimica Acta*, Vol 53, 11, 20 Apr. 2008, 3779-3788.

Examples of EDOT monomers are shown below:

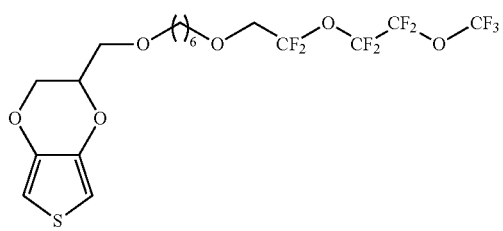

1

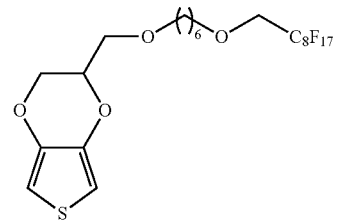

2

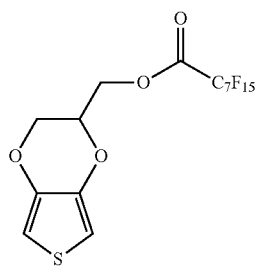

3

A third approach involves the direct attachment of an organic group to the copper surface to reduce water adsorption and increase the surface energy of the surface. A number of different approaches are possible including the reaction of a silyl-chloride with a hydrophobic backbone, a silyl alkoxide with a hydrophobic backbone, or a perfluorinated alkoxy silane, with the surface. Example materials are shown in Table 1 below. An example of this approach, used for organic electronics purposes, is given in Lee, *Relationship between the chemical nature of silanes and device performance of polymer light emitting diodes*, Thin Solid Films, Vol 515, 4, 5 Dec. 2006, 2705-2708.

TABLE 1

| (1) 1H,1H,2H,2H-Perfluorooctyltriethoxysilane |
|---|
| ![structure] |
| (2) Trichloro(1H,1H,2H,2H-perfluorooctyl)silane |
| $CF_3(CF_2)_5CH_2CH_2$—Si(Cl)(Cl)—Cl |
| (3) Trichloro(3,3,3-trifluoropropyl)silane |
| $F_3C$—CH$_2$CH$_2$—SiCl$_3$ |
| (4) Trimethoxymethyl(3,3,3-trifluoropropyl) silane |
| $F_3C$—CH$_2$CH$_2$—Si(OCH$_3$)(OCH$_3$)(OCH$_3$) |
| (5) (Pentafluorophenyl)triethoxysilane |
| ![structure] |

This approach has not been previously disclosed for use with fuel cell current collection and/or distribution layers or plates.

For example, one possibility in this approach is to use the formation of a diazo compound from a functionalised aniline followed by reaction of the diazo compound with the substrate or electrochemical reduction to lead to direct electrochemical deposition of the material.

A Scheme showing the production of diazo derivative followed by derivatisation of a surface either by direct reduction due to surface hydrogen (1) or electrochemical reduction (2), or direct electrochemical deposition (3) is outlined below:

Scheme

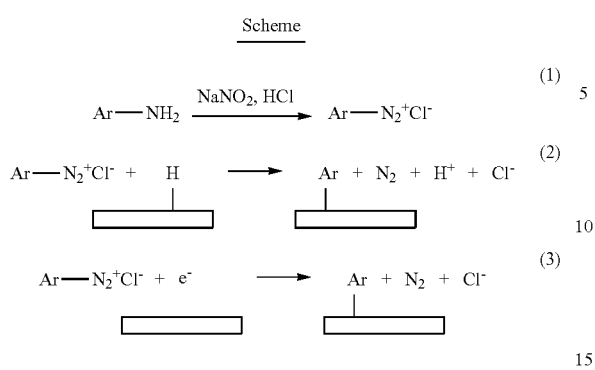

Other approaches for producing the diazo salt are possible, and there are a range of possible reaction conditions.

A chemical process has been disclosed for fuel cell catalyst layers in which the penta fluoro aryl group is bonded to a carbon surface by Xu et al., *Electrochem. Solid-State Lett.*, Vol 8, 10, pA492-A494, (2005). However, there is no disclosure on the application of this process to fuel cell current collection and/or distribution layers or plates.

Examples of perfluoro aniline derivatives for use with the diazo approach are shown in Table 2 below. Other examples include aniline with the same pendant chains as those shown for the EDOT monomers (1)-(3), above.

TABLE 2

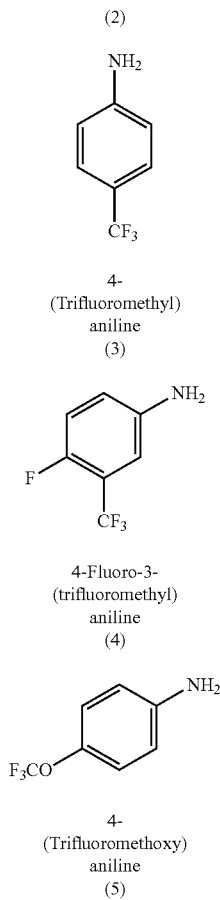

TABLE 2-continued

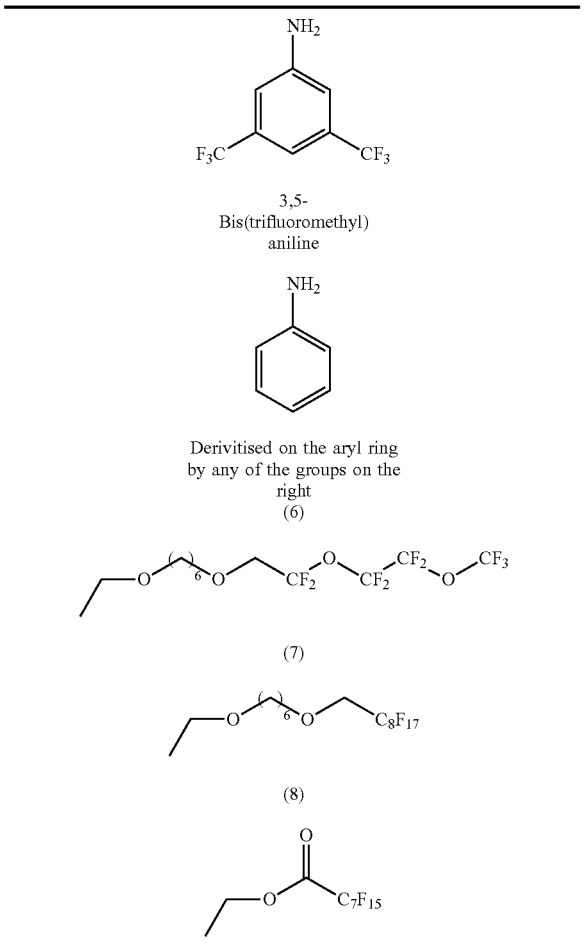

In this approach, it is also possible to use a chemical process to coat the copper surface with perfluoro derivatised aryl groups on silicon. Whilst this process has been described in Stewart et al., *J. Am. Chem. Soc.* 126 (1): 370, the application of this approach to fuel cell current collector and/or distribution layers or plates has not been described.

An electrochemical process described in Lyskawa and Bélanger, *Chem. Mater.*, 2006, 18 (20), 4755-4763, has been used to derivatise both metal and carbon, but has not been applied to fuel cell current collector and/or distribution layers or plates.

There is no disclosure of the deposition of fluorinated materials using the electrochemical approach, as is described by the present invention.

The electrochemical approach devised by the Applicant to deposit the perfluoro group on a surface is different from normal approaches, because of the instability of the intermediate azo compound.

The following are examples of use that are intended to illustrate the invention, and not intended to limit the scope of the claims:

(a) A conductive carbon ink is screen printed onto the copper electrode surface and dried in an oven at 120° C. Examples of suitable inks are
  1. Carbon conductive ink XZ302-1 manufactured by Sun Chemical Corporation.
  2. Carbon conductive ink SD 2843HAL manufactured by Peters Lackwerke GmbH.

(b) Synthesis of compound (1) of the EDOT monomers was undertaken as described in Benedetto et al. A 10 mM solution of (1) in acetonitrile containing 0.1 M $Bu_4N\ PF_6$ was electropolymerised onto the copper surface by sweeping the electrochemical potential to a value of 1.1V.

(c) (Pentafluorophenyl) triethoxysilane was dissolved in 0.5 mol $dm^{-3}$ HCl to a concentration of 10 mmol $dm^{-3}$. $NaNO_3$ was added to this solution in an ice bath to a concentration of 20 mmol $dm^{-3}$. A copper surface was placed in this solution and held at a potential of −0.2 V vs. a saturated calomel electrode for five minutes.

(d) A copper surface was cleaned and coated with tridecafluoro-1,1,2,2-tetrahydrooctyl-1-siloxane. The silane solution was prepared by dissolving 1H,1H,2H,2H-Perfluorooctyltriethoxysilane in 100 ml of butanol/$H_2O$ (95/5) solution containing a few drops of acetic acid at a concentration of 0.2 wt. %. The solution was stirred for 60 minutes to hydrolyze silane materials and then the cleaned copper surface was dip coated with the hydrolysed silane solution. After dip coating, the silane treated copper substrates were washed with toluene several times to get a layer of silane. The silane coated substrate was dried at 160° C. for 5 minutes to remove residual solvents after toluene washing.

The following examples relate to combinations of coating techniques, to achieve more than one corrosion resistant coating layer:

(e) The method of example (a) is followed by the method of example (b), in which electropolymerisation occurs on the surface produced in (a), rather than on the "copper surface" referred to in example (b).

(f) The method of example (a) is followed by the method of example (c), in which (pentafluorophenyl) triethoxysilane is coated onto the surface produced in (a), rather than on the "copper surface" referred to in example (c).

(g) The method of example (a) is followed by the method of example (d), in which tri decafluoro-1,1,2,2-tetrahydrooctyl-1-siloxane is coated onto the surface produced in (a), rather than on the "copper surface" referred to in example (d).

(h) The method of example (b) is followed by the method of example (c), in which (pentafluorophenyl) triethoxysilane is coated onto the surface produced in (b), rather than on the "copper surface" referred to in example (c).

The invention claimed is:

1. A fuel cell comprising:
a) at least two fuel cell boards, each of the fuel cell boards comprising at least one ion permeable membrane and a plurality of anodes and a plurality of cathodes, wherein the anodes and the cathodes are arranged in pairs such that each of the anodes is located on a side of the membrane opposite to one of the cathodes;
b) gas flow channels arranged between adjacent ones of the fuel cell boards for supplying an oxidisable gas to each of the anodes and a reducible gas to each of the cathodes; and
c) electrical connectors for connecting adjacent pairs of the anodes and the cathodes on the same one of the fuel cell boards;
wherein each of the fuel cell boards is arranged so that the anodes and the cathodes on one of the boards are located opposite to the anodes and cathodes, respectively, on an adjacent one of the boards;
wherein the membrane of each of the fuel cell boards is bonded to a multilayer Printed Circuit Board comprising a first current collection and distribution layer, a reactant distribution layer, and a second current collection and distribution layer; and
wherein the layers are bonded together to form the multilayer Printed Circuit Board.

2. The fuel cell as claimed in claim 1, wherein the electrical connectors include:
i) a through-membrane connection comprising at least one electrically conductive region located in the membrane, or
ii) an external connection provided by the multilayer Printed Circuit Board.

3. The fuel cell as claimed in claim 1, wherein the at least two fuel cell boards comprises at least three fuel cell boards.

4. The fuel cell as claimed in claim 1, wherein the at least one ion permeable membrane of each of the fuel cell boards comprises one ion permeable membrane supporting at least two of the anodes on a first face of the one membrane and two of the cathodes on a second face of the one membrane.

5. The fuel cell as claimed in claim 1, wherein:
a) the at least one ion permeable membrane of each of the fuel cell boards comprises one ion permeable membrane supporting at least three of the anodes on a first face of the one membrane and at least three of the cathodes on a second face of the one membrane; or
b) the at least one ion permeable membranes of each of the fuel cell boards comprises at least three ion permeable membranes, each of the membranes supporting one of the anodes on a first face of the membrane and one of the cathodes on a second face of the membrane.

6. The fuel cell as claimed in claim 1, wherein the connected anodes and cathodes of the adjacent pairs of the connected anodes and cathodes partially overlap.

7. The fuel cell as claimed in claim 1, wherein each of the current collection and distribution layers of the multilayer Printed Circuit Board comprises a frame that carries panels of electrical distribution tracks to link the anode of a first pair of the anodes and cathodes to the cathode of an adjacent pair of the anodes and cathodes, in order to connect the the anodes and cathodes on each of the fuel cell boards in electrical series.

8. The fuel cell as claimed in claim 1, wherein each of the current collection and distribution layers of the multilayer Printed Circuit Board comprises holes capable of forming a conduit that runs substantially perpendicular to planar surfaces of the fuel cell boards when a plurality of the fuel cell boards are stacked together.

9. The fuel cell as claimed in claim 8, each layer of each multilayer Printed Circuit Board comprises a plurality of holes that, on stacking of the fuel cell boards, line up to form a plurality of conduits through the fuel cell.

10. The fuel cell as claimed in claim 8, wherein the conduit acts as an inlet or outlet channel for a reactant.

11. The fuel cell as claimed in claim 8, wherein the conduit acts as an inlet or outlet for a coolant.

12. The fuel cell as claimed in claim 1, wherein the reactant distribution layer of the multilayer Printed Circuit Board comprises a frame defining a plurality of reactant distribution channels, and holes capable of forming a conduit that runs substantially perpendicular to planar surfaces of the fuel cell boards when a plurality of the fuel cell boards are stacked together.

13. The fuel cell as claimed in claim 1, wherein either
a) one membrane of the at least one ion permeable membrane is substantially gas impervious electrolyte material supporting at least two of the anodes on a first face of the membrane and two of the cathodes on a second face of the membrane, the one membrane bonded to the Printed Circuit Board; or b) at least two membranes of the at least one ion permeable membrane are substantially gas impervious electrolyte material, each of the membranes supporting one of the anodes on a first face of the membrane and one of the cathodes on a second face of the membrane, the at least two membranes bonded to the Printed Circuit Board;

wherein one of the anodes of the plurality of anodes is on the first face of the membrane are located substantially opposite one another and form a pair of electrodes.

14. The fuel cell as claimed in claim 1, wherein the at least one membrane is, or at least two membranes of the at least one membrane are, bonded to the Printed Circuit Board such that the surface area of each pair of the anodes and cathodes corresponds to a panel of electrical distribution tracks on each of the current collection and distribution layers, and a reactant distribution channel.

15. The fuel cell, as claimed claim 1, wherein a reactant is delivered to the the anodes and cathodes by means of a conduit formed by stacking the fuel cell boards, wherein the conduit runs substantially perpendicular to planar surfaces of the fuel cell boards.

16. The fuel cell, as claimed in claim 15, wherein said conduit is connected to a reactant distribution channel on the reactant distribution layer of each of the fuel cell boards.

17. The fuel cell, as claimed in claim 15, wherein for each pair of the anodes and cathodes on each of the fuel cell boards, there is provided a first conduit that serves to provide a first reactant to a first end of a first reactant distribution channel, a second conduit that serves to accept said first reactant from a second end of said first reactant distribution channel, a third conduit that serves to provide a second reactant to a first end of a second reactant distribution channel, and a fourth conduit that serves to accept said second reactant from a second end of said second reactant distribution channel.

18. The fuel cell, as claimed in claim 17, wherein said first reactant distribution channel comprises at least two first reactant distribution channels, wherein said second reactant distribution channel comprises at least two second reactant distribution channels, and wherein said first conduit provides the first reactant to a first end of said at least two first reactant distribution channels, said second conduit accepts said first reactant from a second end of said at least two first reactant distribution channels, said third conduit provides the second reactant to a first end of said at least two second reactant distribution channels, and said fourth conduit accepts said second reactant from a second end of said at least two second reactant distribution channels.

19. The fuel cell as claimed in claim 1, wherein a catalyst layer is provided adjacent to the the anodes and cathodes.

20. The fuel cell as claimed in claim 19, wherein the catalyst layer is electrically conductive and comprises an outer layer adjacent a reactant conduit.

21. The fuel cell as claimed in claim 19, wherein a gas diffusion layer is provided as an outer layer, adjacent on one side to a reactant conduit and on the other to the catalyst layer.

22. The fuel cell as claimed in claim 21, wherein the gas diffusion layer is composed of one or more of an electrically conductive or non-conductive material.

23. The fuel cell as claimed in claim 1, wherein adjacent ones of the fuel cell boards in a stack are separated by an insulating spacer.

24. The fuel cell according to claim 23 wherein the spacer has integrated coolant conduits.

25. The fuel cell according to claim 23, wherein the spacer is shaped to assist the distribution of reactants.

26. The fuel cell as claimed in claim 23, wherein the spacer further comprises water supply or extraction conduits.

27. The fuel cell as claimed in claim 1, wherein on each face of each of the fuel cell boards, the sequence of the anodes and the cathodes alternates such that each of the anodes, except the anode on an edge of the fuel cell board, lies between two of the cathodes, and each cathodes, except the cathode on the edge of the fuel cell board, lies between two of the anodes, and the fuel cell boards in the fuel cell are stacked such that the anodes of two adjacent ones of the fuel cell boards lie substantially opposite each other, and the cathodes of two adjacent ones of the fuel cell boards lie substantially opposite each other.

28. The fuel cell as claimed in claim 27, wherein a first reactant is delivered to a pair of the anodes on first and second adjacent ones of the fuel cell boards by a single first reactant distribution channel on one of said reactant distribution layers, and a second reactant is delivered to a pair of the cathodes on said first and second adjacent ones of the fuel cell boards by a single second reactant distribution channel on said one of said reactant distribution layers.

29. The fuel cell as claimed in claim 1, wherein each face of each of the fuel cell boards carries either only the anodes or only the cathodes, and the fuel cell boards in the fuel cell are arranged so that the anodes of two adjacent ones of the fuel cell boards lie substantially opposite each other, and the cathodes of two adjacent ones of the fuel cell boards lie substantially opposite each other.

30. The fuel cell as claimed in claim 1, wherein the current collection and distribution layers of the multilayer Printed Circuit Board comprise a corrosion resistant coating.

31. The fuel cell as claimed in claim 30 wherein the corrosion resistant coating comprises a conductive polymer, a conductive metal oxide, a carbon conductive ink, or a perfluorinated silane or diazo reagent.

32. The fuel cell as claimed in claim 31, wherein the conductive polymer is selected from polyaniline, polypyrrole, polythiophene and poly(3,4-ethylenedioxythiophene) (PEDOT), and the conductive metal oxide is selected from $Ti_4O_7$; $Ti_{0.9}Nb_{0.1}O_2$; or tin oxide doped with antimony, fluorine, or indium, and the silane or diazo compound is selected from 1H,1H,2H,2H-Perfluorooctyltriethoxysilane, Trichloro (1H,1H,2H,2H-perfluorooctyl) silane, Trichloro (3,3,3-trifluoropropyl) silane, Trimethoxy-methyl(3,3,3-trifluoropropyl) silane, or (Pentafluorophenyl) triethoxysilane.

33. The fuel cell according to claim 30, wherein the reactant distribution layer comprise the corrosion resistant coating.

* * * * *